(12) United States Patent
Prahlad et al.

(10) Patent No.: US 9,093,926 B2
(45) Date of Patent: Jul. 28, 2015

(54) ELECTROADHESIVE CONVEYING SURFACES

(71) Applicant: SRI International, Menlo Park, CA (US)

(72) Inventors: Harsha Prahlad, Cupertino, CA (US); Ronald E. Pelrine, Longmont, CO (US); Brian K. McCoy, Sunnyvale, CA (US); Thomas P. Low, Belmont, CA (US)

(73) Assignee: SRI International, Menlo Park, CA (US)

( * ) Notice: Subject to any disclaimer, the term of this patent is extended or adjusted under 35 U.S.C. 154(b) by 238 days.

(21) Appl. No.: 13/886,052

(22) Filed: May 2, 2013

(65) Prior Publication Data

US 2013/0294875 A1    Nov. 7, 2013

Related U.S. Application Data

(60) Provisional application No. 61/641,728, filed on May 2, 2012, provisional application No. 61/739,212, filed on Dec. 19, 2012.

(51) Int. Cl.
 *H02N 13/00* (2006.01)
 *B25J 15/00* (2006.01)
 *B65G 17/46* (2006.01)

(52) U.S. Cl.
 CPC ............. *H02N 13/00* (2013.01); *B25J 15/0085* (2013.01); *B65G 17/46* (2013.01)

(58) Field of Classification Search
 CPC ...... H02N 13/00; B65G 17/46; B25J 15/0085
 USPC .......................................................... 361/234
 See application file for complete search history.

(56) References Cited

U.S. PATENT DOCUMENTS 5,173,834 A * 12/1992 Sogoh ........................... 361/234
5,774,153 A *  6/1998 Kuehnle et al. ............... 347/129

(Continued)

FOREIGN PATENT DOCUMENTS

DE          4120155 A1   12/1992
DE     202005011756 U1   11/2005

(Continued)

OTHER PUBLICATIONS

International Search Report and Written Opinion, PCT International Application No. PCT/US2013/039325, dated Jan. 17, 2014.

*Primary Examiner* — Thienvu Tran
*Assistant Examiner* — Kevin J Comber
(74) *Attorney, Agent, or Firm* — McDonnell Boehnen Hulbert & Berghoff LLP

(57) ABSTRACT

An electroadhesive gripping platform includes one or more electrodes. A power supply is configured to apply voltage to the one or more electrodes in the electroadhesive platform via one or more terminals. A controller is configured to operate the electroadhesive gripping platform to selectively adhere to items loaded thereon and thereby enhance traction control over such items. The controller can control the power supply to apply a voltage to the one or more electrodes in the electroadhesive platform to thereby cause the electroadhesive platform to adhere to an item disposed on the electroadhesive platform such that the item resists moving with respect to the electroadhesive platform. The controller can also control the voltage supply to reduce the voltage applied to the one or more terminals such that the item moves with respect to the electroadhesive platform.

15 Claims, 14 Drawing Sheets

(56) References Cited

U.S. PATENT DOCUMENTS

2003/0034281 A1* 2/2003 Kumar .................... 209/579
2011/0193362 A1* 8/2011 Prahlad et al. ............ 294/81.2

FOREIGN PATENT DOCUMENTS

| | | |
|---|---|---|
| EP | 0297227 A2 | 1/1989 |
| JP | 2003285289 | 10/2003 |

* cited by examiner

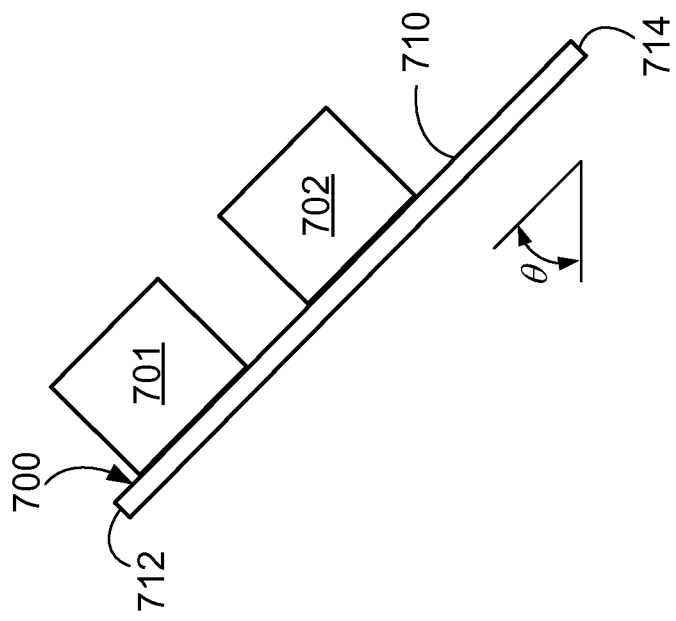
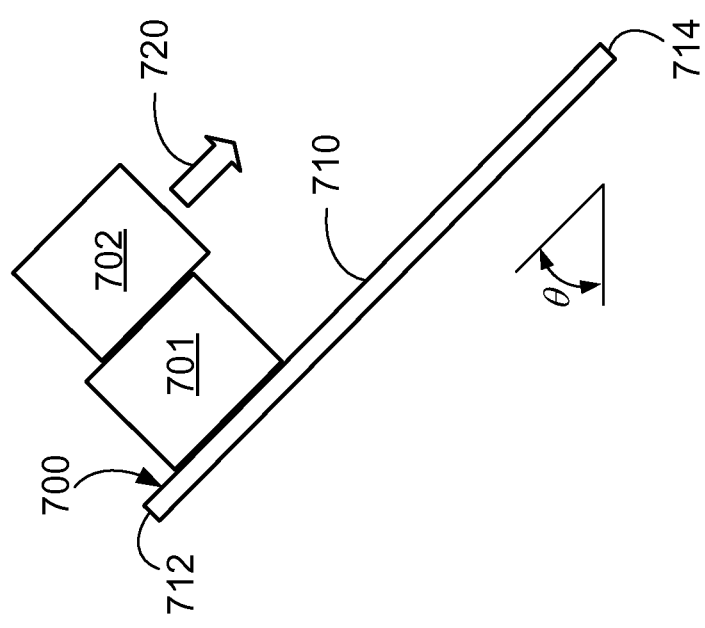
FIG. 7A
FIG. 7B

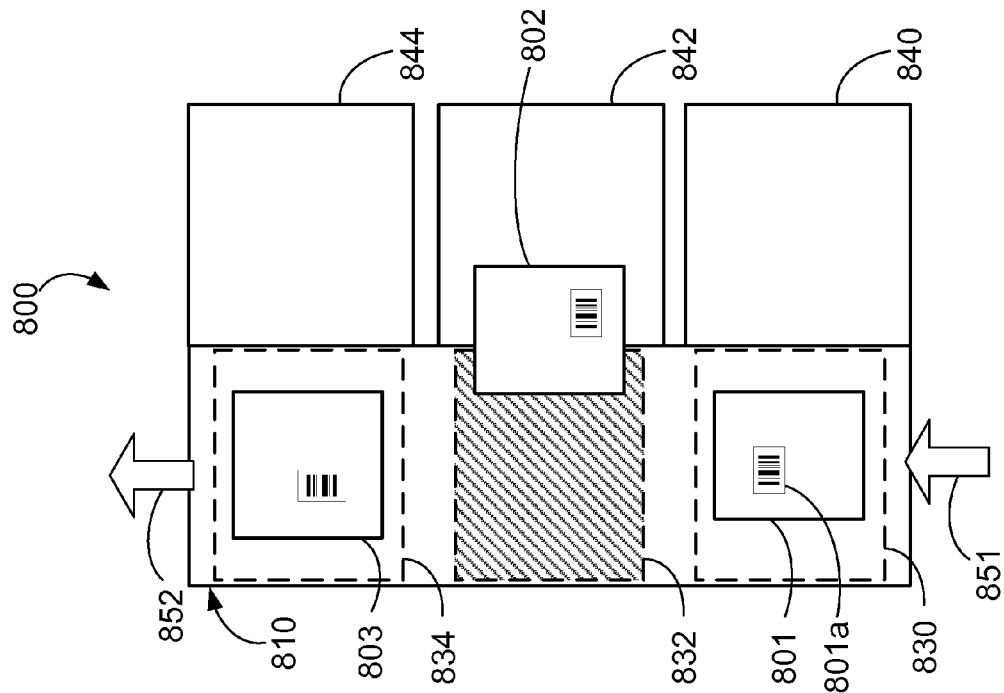
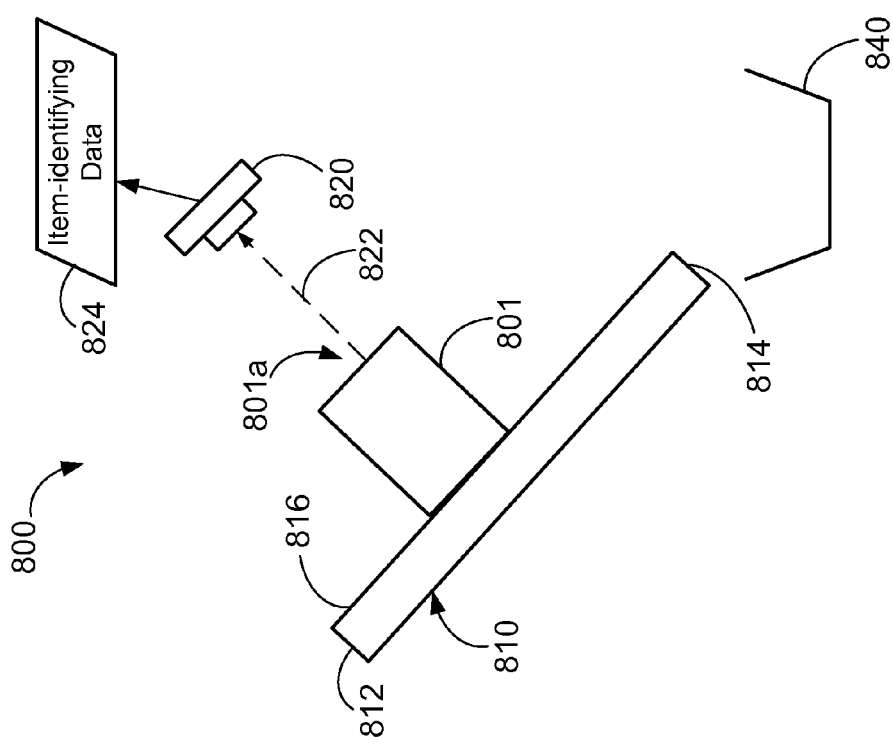

ELECTROADHESIVE CONVEYING SURFACES

CROSS-REFERENCE TO RELATED APPLICATIONS

This application claims priority to U.S. Provisional Patent Application No. 61/641,728, filed May 2, 2012, and to U.S. Provisional Patent Application No. 61/739,212, filed Dec. 19, 2012, both of which are incorporated herein by reference in their entireties and for all purposes.

BACKGROUND

Unless otherwise indicated herein, the materials described in this section are not prior art to the claims in this application and are not admitted to be prior art by inclusion in this section.

The mass production of products has led to many innovations over the years. Substantial developments have been made in the industrial handling of various materials and items, particularly in the area of robotics. For example, various types of robotics and other automated systems are now used in order to "pick and place" items during many manufacturing and other materials handling processes. Such robotics and other systems can include robot arms that, for example, grip, lift and/or place an item as part of a designated process. Of course, other manipulations and materials handling techniques can also be accomplished by way of such robotics or other automated systems. Despite many advances over the years in this field, there are limitations as to what can be handled in such a manner.

Conventional robotic grippers typically use either suction or a combination of large normal forces and fine control with mechanical actuation in order to grip objects. Such techniques have several drawbacks. For example, the use of suction tends to require smooth, dean, dry and generally flat surfaces, which limits the types and conditions of objects that can be gripped. Suction also tends to require a lot of power for the pumps and is prone to leaks at any location on a vacuum or low pressure seal, with a resulting loss of suction being potentially catastrophic. The use of mechanical actuation often requires large normal or "crushing" forces against an object, and also tends to limit the ability to robotically grip fragile or delicate objects. Producing large forces also increases the cost of mechanical actuation. Mechanical pumps and conventional mechanical actuation with large crushing forces also often require substantial weight, which is a major disadvantage for some applications, such as the end of a robot arm where added mass must be supported. Furthermore, even when used with sturdy objects, robotic arms, mechanical claws and the like can still leave damaging marks on the surface of the object itself.

SUMMARY

Some examples relate to electroadhesive surfaces and devices. Such an electroadhesive surface can include electrodes that are configured to induce an electrostatic attraction with nearby objects when an appropriate voltage or current is applied to the electrodes. In some cases the electrode polarization can induce a corresponding polarization in a nearby object to effect adhesion of the object to the electroadhesive surface. Systems for operating such an electroadhesive surface can include an electroadhesive platform, one or more power supplies and a controller. The power supply can be configured to apply voltage or current to the one or more electrodes in the electroadhesive platform.

Some embodiments of the present disclosure provide a system. The system can include an electroadhesive platform, a power supply and a controller. The electroadhesive platform can include one or more electrodes. The power supply can be configured to apply voltage to the one or more electrodes in the electroadhesive platform via one or more terminals. The controller can be configured to (i) control the power supply to apply a voltage to the one or more electrodes in the electroadhesive platform to thereby cause the electroadhesive platform to adhere to an item disposed on the electroadhesive platform such that the item resists moving with respect to the electroadhesive platform and (ii) control the voltage supply to reduce the voltage applied to the one or more terminals such that the item moves with respect to the electroadhesive platform.

Some embodiments of the present disclosure provide a system. The system can include an electroadhesive conveyor belt, a power supply, a driving system, and a controller. The electroadhesive conveyor belt can include an outer surface, an inner surface, one or more electrodes arranged between the inner and outer surfaces, and one or more conductive terminals situated along the inner surface and electrically connected to corresponding ones of the one or more electrodes. The power supply can be configured to apply voltage to the one or more electrodes in the electroadhesive conveyor belt via the one or more conductive terminals. The driving system can be configured to cause the electroadhesive conveyor belt to circulate such that the outer surface of the electroadhesive conveyor belt moves along a predetermined track. The controller can be configured to control the power supply to apply a voltage to the one or more electrodes in the electroadhesive conveyor belt to thereby cause the electroadhesive conveyor belt to adhere to an item disposed on the outer surface such that the item resists moving with respect to the outer surface.

Some embodiments of the present disclosure provide a method. The method can include applying a voltage to one or more electrodes in an electroadhesive platform to thereby cause the electroadhesive platform to adhere to an item disposed on the electroadhesive platform. The method can include moving the electroadhesive platform while applying the voltage, such that the item substantially tracks a path of the electroadhesive platform. The method can include reducing the voltage applied to the one or more terminals such that the item moves with respect to the electroadhesive platform.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 7A illustrates an example electroadhesive platform that is sloped to distribute stacked items in a single layer.

FIG. 7B illustrates the sloped electroadhesive platform shown in FIG. 7A after items are distributed in a single layer.

FIG. 8A is an end view of an example sorting system using an inclined conveyor with separately addressable subsections.

FIG. 8B is a top view of the example sorting system shown in FIG. 8A.

DETAILED DESCRIPTION

Figure 1A:
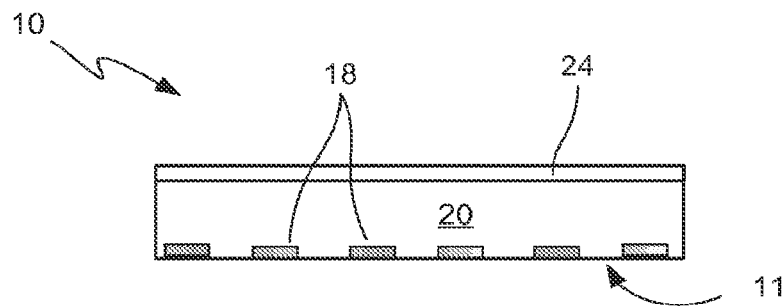
FIG. 1A is a side cross-section of an example electroadhesive end effector.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Some embodiments of the present disclosure utilize various electroadhesive gripping systems to manipulate objects adhered thereto. In particular, some examples disclosed herein include electroadhesive, surfaces used to convey objects resting on such surfaces. Such electroadhesive horizontal surfaces can be incorporated into lifting platforms and/or lifting arms for mobile hoists, parcel-handling robots, conveyor belts, and so on. The electroadhesive attraction between the electroadhesive platform and the items resting thereon can supplement traction control over the items. The increased traction control allows the electroadhesive platforms to undergo greater acceleration without items slipping from the platform. Thus, electroadhesive platforms can allow objects to be moved (translated) while resting on the platform without shifting in position on the platform. Moreover, electroadhesive conveyor belts can operate at greater speeds or accelerations while moving around corners, up and down gradients, etc.

Example electroadhesive traction control systems may include an electroadhesive platform gripper and/or an electroadhesive conveyor belt. An electroadhesive platform gripper can include an electroadhesive surface with electrodes disposed on or within the surface. The electrodes may be coated by a protective layer to prevent damage and/or incidental discharge of the electrodes. A support structure receives the burden of items placed on the platform, and allows the platform to be manipulated. When an appropriate voltage is applied to polarize the electrodes, the platform adheres to one or more foreign objects loaded thereon by inducing a complementary polarization in such foreign objects to thereby electrostatically attract the foreign objects to the platform. The resulting adhesion between the platform surface and the foreign object causes the foreign object to resist sliding with respect to the platform surface.

An electroadhesive conveyor belt includes a pattern of electrodes disposed on or within a moveable surface of a conveyor belt. The conveyor belt, including the integrated electrodes, can be configured to flex while the belt wraps around driving wheels/pulleys of the conveyor system, turns around bends, and so on. The conveyor track can also include high voltage contacts that supply voltage to the electrodes in the moving belt through vias within the belt that electrically connect the electrodes to voltage supply terminals on the back side of the belt (i.e., the side that moves along the track). Such vias may be spaced intermittently, such that adjacent ones of the vias each contact a given voltage supply terminal on the track in turn as the belt moves. In some cases, the supply terminals on the track may be rolling contacts (e.g., wheels conductive along the outer rim). Such rolling contacts can provide reduced friction resistance between the belt and the supply terminals while the belt moves with respect to the track, as compared to a sliding contact system.

Given the ability to selectively adhere to items loaded on electroadhesive platforms by selectively applying voltage to the electroadhesive electrodes of such platforms, sorting systems may be created that use one or more electroadhesive platform grippers to sort a group of intermixed packages. For example, packages in a sorting facility can be recognized/characterized using identifying information on such packages. Packages can then electroadhesively secured to an electroadhesive platform and conveyed toward a designated delivery location for the identified package. The package can then be released while the platform approaches the delivery location by deactivating the electroadhesion. Upon release, the package follows an inertial path (e.g., in a controlled slide) toward the delivery location to thereby deliver the package.

Selectively adhering platforms can thus be used to deliver packages situated thereon by releasing packages while the platform decelerates, turns, etc. to allow the package to continue on along an inertial path. Selectively adhering platforms can also be used to release packages to desired locations by tilting the platform such that packages are secured to the platform against gravity. Releasing packages allows the packages to slide from the tilted platform, along a gravity-defined path, and into a desired delivery location.

II. Example Electroadhesive Systems

The present disclosure relates in various embodiments to an electroadhesive gripping device or system adapted to handle objects and materials. In particular, such an electroadhesive gripping system can be adapted to hold, move or even pick and place a wide variety of objects, including small, dirty and/or fragile objects. Such handling can be accomplished with minimal mechanical or "crushing" forces from the gripping system onto the foreign object, due to the use of mostly electroadhesive forces. In addition to the moving and picking and placement of items, further applications of the provided electroadhesive gripping system are also possible, such that it will be understood that the provided electroadhesive gripping system is not limited to use to such applications.

2a) Electroadhesion

As the term is used herein, 'electroadhesion' refers to the mechanical coupling of two objects using electrostatic forces. Electroadhesion as described herein uses electrical control of these electrostatic forces to permit temporary and detachable attachment between two objects. This electrostatic adhesion holds two surfaces of these objects together or increases the effective traction or friction between two surfaces due to electrostatic forces created by an applied electric field. In addition to holding two flat, smooth and generally conductive surfaces together, disclosed herein are electroadhesion devices and techniques that do not limit the material properties or surface roughness of the objects subject to electroadhesive forces and handling. In some cases, an electroadhesive surface may be a compliant surface to facilitate electroadhesive attraction independent of surface roughness. For example, the electroadhesive surface may have sufficient flexibility for the surface to follow local non-uniformities and/or imperfections of an exterior surface of an adhered object. For example, the electroadhesive surface can at least partially conform to microscopic, mesoscopic, and/or macroscopic surface features. When an appropriate voltage is applied to such a compliant electroadhesive surface, the electroadhesive surface is attracted to the exterior surface of the adhered object, and the attraction causes the electroadhesive surface to at least partially conform to the exterior surface by flexing locally such that the electroadhesive surface moves toward the exterior surface.

Turning first to FIG. 1A, an example electroadhesive end effector is illustrated in elevated cross-sectional view. Electroadhesive end effector 10 includes one or more electrodes 18 located at or near an "electroadhesive gripping surface" 11 thereof, as well as an insulating material 20 between electrodes and a backing 24 or other supporting structural component. For purposes of illustration, electroadhesive end effector 10 is shown as having six electrodes in three pairs, although it will be readily appreciated that more or fewer electrodes can be used in a given electroadhesive end effector. Where only a single electrode is used in a given electroadhesive end effector, a complimentary electroadhesive end effector having at least one electrode of the opposite polarity is preferably used therewith. With respect to size, electroadhesive end effector 10 is substantially scale invariant. That is, electroadhesive end effector sizes may range from less than 1 square centimeter to greater than several meters in surface area. Even larger and smaller surface areas are also possible, and may be sized to the needs of a given application.

Figure 1B:
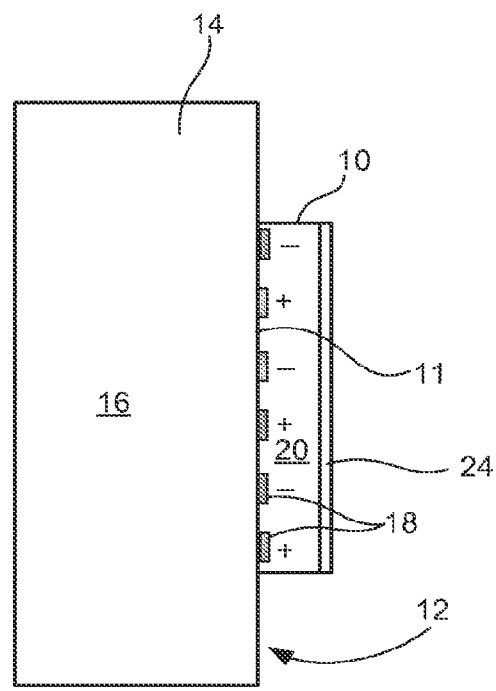
FIG. 1B illustrates in side cross-sectional view the example electroadhesive end effector of FIG. 1A adhered to a foreign object.

FIG. 1B depicts in elevated cross-sectional view of the example electroadhesive end effector 10 of FIG. 1A adhered to a foreign object 14. Foreign object 14 includes surface 12 and inner material 16. Electroadhesive gripping surface 11 of electroadhesive end effector 10 is placed against or nearby surface 12 of foreign object 14. An electrostatic adhesion voltage is then applied via electrodes 18 using external control electronics (not shown) in electrical communication with the electrodes 18. As shown in FIG. 1B, the electrostatic adhesion voltage uses alternating positive and negative charges on neighboring electrodes 18. As a result of the voltage difference between electrodes 18, one or more electroadhesive forces are generated, which electroadhesive forces act to hold the electroadhesive end effector 10 and foreign object 14 against each other. Due to the nature of the forces being applied, it will be readily appreciated that actual contact between electroadhesive end effector 10 and foreign object 14 is not necessary. Rather sufficient proximity to allow the electric field based electroadhesive interaction to take place is all that is necessary. For example, a piece of paper, thin film, or other material or substrate may be placed between electroadhesive end effector 10 and foreign object 14. Furthermore, although the term "contact" is used herein to denote the interaction between an electroadhesive end effector and a foreign object, it will be understood that actual direct surface to surface contact is not always required, such that one or more thin objects such as an insulator, can be disposed between an end effector or electroadhesive gripping surface and the foreign object. In some embodiments such an insulator between the gripping surface and foreign object can be a part of the end effector, while in others it can be a separate item or device.

Additionally or alternatively, there may be a gap between the electroadhesive gripping surface and the object being gripped and this gap can be decreased upon activation of the electroadhesive force. For example, the electroadhesive force can cause the electroadhesive gripping surface to move closer to the exterior surface of the object being gripped so as to close the gap. Moreover, the electroadhesive attraction can cause the gripping surface to move toward the exterior surface of the object being gripped at multiple points across the surface area of the gripping surface. For example, the compliant gripping surface to conform to the exterior surface microscopically, mesoscopically, and/or macroscopically. Such local gap-closing by the gripping surface can thereby cause the gripping surface to (at least partially) conform to the exterior surface of the object. Electroadhesive gripping surfaces with sufficient flexibility to conform to local non-uniformities, surface imperfections and other micro-variations and/or macro-variations in exterior surfaces of objects being adhered to are referred to herein as compliant gripping surfaces. However, it is understood that any of the gripping surfaces described herein may exhibit such compliance whether specifically referred to as compliant gripping surfaces or not.

Figure 1C:
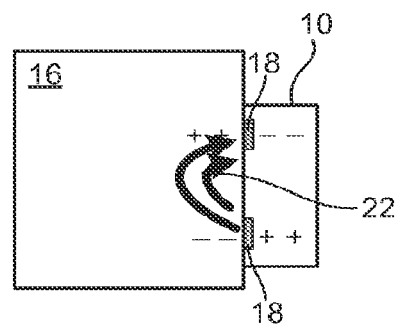
FIG. 1C illustrates in side cross-sectional close-up view an electric field formed in the foreign object of FIG. 1B as result of the voltage difference between electrodes in the adhered example electroadhesive end effector.

FIG. 1C illustrates in elevated cross-sectional close-up view an electric field formed in the foreign object of FIG. 1B as a result of the voltage difference between electrodes in the adhered example electroadhesive end effector 10. While the electroadhesive end effector 10 is placed against foreign object 14 and an electrostatic adhesion voltage is applied, an electric field 22 forms in the inner material 16 of the foreign object 14. The electric field 22 locally polarizes inner material 16 or induces direct charges on material 16 locally opposite to the charge on the electrodes of the end effector 18 and thus causes electrostatic adhesion between the electrodes 18 (and end effector 10) and the induced charges on the foreign object 16. The induced charges may be the result of a dielectric polarization or from weakly conductive materials and electrostatic induction of charge. In the event that the inner material 16 is a strong conductor, such as copper for example, the induced charges may completely cancel the electric field 22. In this case the internal electric field 22 is zero, but the induced charges nonetheless still form and provide electrostatic force to the electroadhesive end effector.

Thus, the electrostatic adhesion voltage provides an overall electrostatic force, between the electroadhesive end effector 10 and inner material 16 beneath surface 12 of foreign object 14, which electrostatic force maintains the current position of the electroadhesive end effector relative to the surface of the foreign object. The overall electrostatic force may be sufficient to overcome the gravitational pull on the foreign object 14, such that the electroadhesive end effector 10 may be used to hold the foreign object aloft. In various embodiments, a plurality of electroadhesive end effectors may be placed against foreign object 14, such that additional electrostatic forces against the object can be provided. The combination of electrostatic forces may be sufficient to lift, move, pick and place, or otherwise handle the foreign object. Electroadhesive end effector 10 may also be attached to other structures and hold these additional structures aloft, or it may be used on sloped or slippery surfaces to increase normal friction forces.

Removal of the electrostatic adhesion voltages from electrodes 18 ceases the electrostatic adhesion force between electroadhesive end effector 10 and the surface 12 of foreign object 14. Thus, when there is no electrostatic adhesion voltage between electrodes 18, electroadhesive end effector 10 can move more readily relative to surface 12. This condition allows the electroadhesive end effector 10 to move before and after an electrostatic adhesion voltage is applied. Well controlled electrical activation and de-activation enables fast adhesion and detachment, such as response times less than about 50 milliseconds, for example, while consuming relatively small amounts of power.

Electroadhesive end effector 10 includes electrodes 18 on an outside surface 11 of an insulating material 20. This embodiment is well suited for controlled attachment to insulating and weakly conductive inner materials 14 of various foreign objects 16. Other electroadhesive end effector 10 relationships between electrodes 18 and insulating materials 20 are also contemplated and suitable for use with a broader range of materials, including conductive materials. For example, a thin electrically insulating material (not shown) can be located on the surfaces of the electrodes. As will be readily appreciated, a shorter distance between surfaces 11 and 12 as well as the material properties of such an electrically insulating material results in a stronger electroadhesive attraction between the objects due to the distance dependence of the field-based induced electroadhesive forces. Accordingly, a deformable surface 11 adapted to at least partially conform to the surface 12 of the foreign object 14 can be used.

As the term is used herein, an electrostatic adhesion voltage refers to a voltage that produces a suitable electrostatic force to couple electroadhesive end effector 10 to a foreign object 14. The minimum voltage needed for electroadhesive end effector 10 will vary with a number of factors, such as: the size of electroadhesive end effector 110, the material conductivity and spacing of electrodes 18, the insulating material 20, the foreign object material 16, the presence of any disturbances to electroadhesion such as dust, other particulates or moisture, the weight of any objects being supported by the electroadhesive force, compliance of the electroadhesive device, the dielectric and resistivity properties of the foreign object, and/or the relevant gaps between electrodes and foreign object surface. In one embodiment, the electrostatic adhesion voltage includes a differential voltage between the electrodes 18 that is between about 500 volts and about 10 kilovolts. Even lower voltages may be used in micro applications. In one embodiment, the differential voltage is between about 2 kilovolts and about 5 kilovolts. Voltage for one electrode can be zero. Alternating positive and negative charges may also be applied to adjacent electrodes 18. The voltage on a single electrode may be varied in time, and in particular may be alternated between positive and negative charge so as to not develop substantial long-term charging of the foreign object. The resultant clamping forces will vary with the specifics of a particular electroadhesive end effector 10, the material it adheres to, any particulate disturbances, surface roughness, and so forth. In general, electroadhesion as described herein provides a wide range of clamping pressures, generally defined as the attractive force applied by the electroadhesive end effector divided by the area thereof in contact with the foreign object.

The actual electroadhesion forces and pressure will vary with design and a number of factors. In one embodiment, electroadhesive end effector 10 provides electroadhesive attraction pressures between about 0.7 kPa (about 0.1 psi) and about 70 kPa (about 10 psi), although other amounts and ranges are certainly possible. The amount of force needed for a particular application may be readily achieved by varying the area of the contacting surfaces, varying the applied voltage, and/or varying the distance between the electrodes and foreign object surface, although other relevant factors may also be manipulated as desired.

Because an electrostatic adhesion force is the primary force used to hold, move or otherwise manipulate a foreign object, rather than a traditional mechanical or "crushing" force, the electroadhesive end effector 10 can be used in a broader set of applications. For example, electroadhesive end effector 10 is well suited for use with rough surfaces, or surfaces with macroscopic curvature or complex shape. In one embodiment, surface 12 includes roughness greater than about 100 microns. In a specific embodiment, surface 12 includes roughness greater than about 3 millimeters. In addition, electroadhesive end effector 10 can be used on objects that are dusty or dirty, as well as objects that are fragile. Objects of varying sizes and shapes can also be handled by one or more electroadhesive end effectors, as set forth in greater detail below. Various additional details and embodiments regarding electroadhesion and applications thereof can be found at, for example, commonly owned U.S. Pat. Nos. 7,551,419 and 7,554,787, which are incorporated by reference herein in their entirety and for all purposes.

2b) Electroadhesive Gripping Surfaces

Although electroadhesive end effector 10 having electroadhesive gripping surface 11 of FIG. 1A is shown as having six electrodes 18, it will be understood that a given electroadhesive end effector or gripping surface can have just a single electrode. Furthermore, it will be readily appreciated that a given electroadhesive end effector can have a plurality of different electroadhesive gripping surfaces, with each separate electroadhesive gripping surface having at least one electrode and being adapted to be placed against or in close proximity to the foreign object to be gripped. Although the terms electroadhesive end effector, electroadhesive gripping unit and electroadhesive gripping surface are all used herein to designate electroadhesive components of interest, it will be understood that these various terms can be used interchangeably in various contexts. In particular, while a given "end effector" might comprise numerous distinct "gripping surfaces," these different gripping surfaces might also be considered separate end effectors themselves. Embodiments with multiple different gripping surfaces may be considered as one single end effector or may also be considered as numerous different end effectors acting in concert.

Figure 2A:
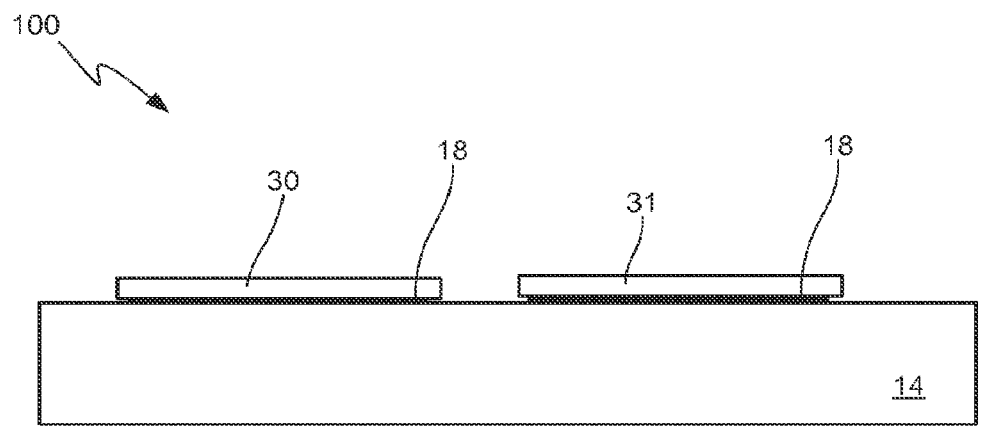
FIG. 2A illustrates in side cross-sectional view an example pair of electroadhesive gripping surfaces or end effectors having single electrodes thereon.
Figure 2B:
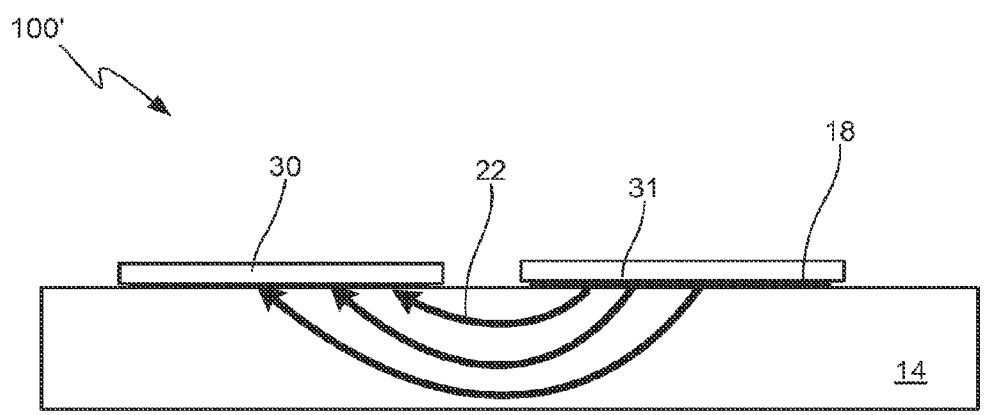
FIG. 2B illustrates in side cross-sectional view the example pair of electroadhesive gripping surfaces or end effectors of FIG. 2A with voltage applied thereto.

Referring to FIGS. 2A and 2B, an example pair of electroadhesive end effectors or gripping surfaces having single electrodes thereon is shown in side cross-sectional view. FIG. 2A depicts electroadhesive gripping system 100 having electroadhesive end effectors or gripping surfaces 30, 31 that are in contact with the surface of a foreign object 16, while FIG. 2B depicts activated electroadhesive gripping system 100' with the end effectors or gripping surfaces having voltage applied thereto. Electroadhesive gripping system 100 includes two electroadhesive end effectors or gripping surfaces 30, 31 that directly contact the foreign object 16. Each electroadhesive end effector or gripping surface 30, 31 has a single electrode 18 coupled thereto. In such cases, the electroadhesive gripping system can be designed to use the foreign object as an insulation material. When voltage is applied, an electric field 22 forms within foreign object 14, and an electrostatic force between the electroadhesive end effectors or gripping surfaces 30, 31 and the foreign object is created. Various embodiments that include numerous of these single electrode electroadhesive end effectors can be used, as will be readily appreciated.

In some embodiments, an electroadhesive gripping surface can take the form of a flat panel or sheet having a plurality of electrodes thereon. In other embodiments, the gripping surface can take a fixed shape that is matched to the geometry of the foreign object most commonly lifted or handled. For example, a curved geometry can be used to match the geometry of a cylindrical paint can or soda can. The electrodes may be enhanced by various means, such as by being patterned on an adhesive device surface to improve electroadhesive performance, or by making them using soft or flexible materials to increase compliance and thus conformance to irregular surfaces on foreign objects.

III. Example Electroadhesive Gripping Systems

Some embodiments of the present disclosure utilize various electroadhesive gripping systems to manipulate objects adhered thereto. In particular, some examples disclosed herein include electroadhesive surfaces used to convey objects resting on such surfaces. Such electroadhesive horizontal surfaces can be incorporated into lifting platforms and/or lifting arms for mobile hoists, parcel-handling robots, conveyor belts, and so on. The electroadhesive attraction between the electroadhesive platform and the items resting thereon can supplement traction control over the items. The increased traction control allows the electroadhesive platforms to undergo greater acceleration without items slipping from the platform. Thus, electroadhesive platforms can allow objects to be moved (translated) while resting on the platform without shifting in position on the platform. Moreover, electroadhesive conveyor belts can operate at greater speeds while moving around corners, up and down gradients, etc. Additionally, selectively controlling electroadhesion at particular locations can allow for a system of electroadhesive platforms and/or conveyors to direct particular items to delivery areas. For example, an item can be electroadhesively held ("locked") to the surface of a conveyor belt until the item approaches a predetermined location along the belt. The electroadhesive attraction can then be deactivated to allow the item to undergo a controlled slide from the conveyor belt to the predetermined location, thereby delivering the item to the predetermined location.

Example electroadhesive traction control systems may include an electroadhesive platform gripper and/or an electroadhesive conveyor belt. An electroadhesive platform gripper can include an electroadhesive surface with electrodes disposed on or within the surface. The electrodes may be coated by a protective layer to prevent damage and/or incidental discharge of the electrodes. A support structure receives the burden of items placed on the platform, and allows the platform to be manipulated. When an appropriate voltage is applied to polarize the electrodes, the platform adheres to one or more foreign objects loaded thereon by inducing a complementary polarization in such foreign objects to thereby electrostatically attract the foreign objects to the platform. The resulting adhesion between the platform surface and the foreign object causes the foreign object to resist sliding with respect to the platform surface.

An electroadhesive conveyor belt includes a pattern of electrodes disposed on or within a moveable surface of a conveyor belt. The conveyor belt, including the integrated electrodes, can be configured to flex while the belt wraps around driving wheels/pulleys of the conveyor system, turns around bends, and so on. The conveyor track can also include high voltage contacts that supply voltage to the electrodes in the moving belt through vias within the belt that electrically connect the electrodes to voltage supply terminals on the back side of the belt the side that moves along the track). Such vias may be spaced intermittently, such that adjacent ones of the vias each contact a given voltage supply terminal on the track in turn as the belt moves. In some cases, the supply terminals on the track may be rolling contacts (e.g., wheels conductive along the outer rim). Such rolling contacts can provide reduced friction resistance between the belt and the supply terminals while the belt moves with respect to the track, as compared to a sliding contact system.

3a) Example Electroadhesive Platform Gripper

Figure 3A:
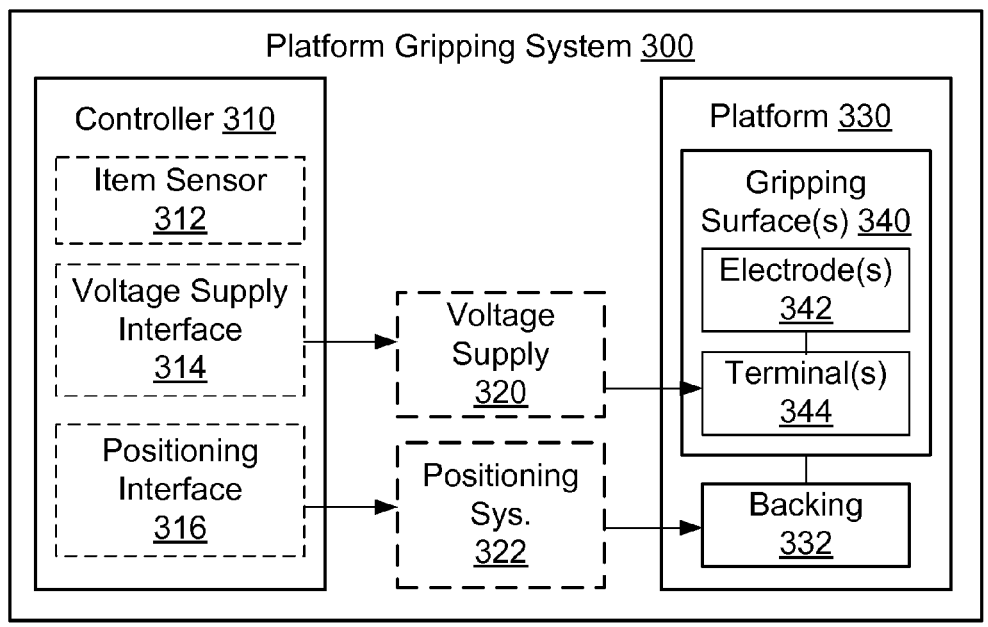
FIG. 3A is a functional block diagram of an example electroadhesive platform gripping system.

FIG. 3A is a functional block diagram of an example electroadhesive platform gripping system 300. The platform gripping system includes a controller 310, a voltage supply 320, and at least one platform gripper 330. The voltage supply 320 can be configured to supply high DC voltages in a range of, for example, 0.5 kilovolt ("kV") to about 10 kV, similar to the electroadhesion voltages discussed above in connection with FIGS. 1-2. The platform gripper 330 has a gripping surface 340 with integrated electrodes 342 connected to the voltage supply 320 via respective terminals 344. The electrodes 342 can be patterned according to a variety of different geometries within the platform surface and are generally arranged such that opposing polarity electrodes are situated adjacent one another. The electrodes 342 may be arranged with opposing polarity electrodes alternating one another (e.g., interdigitated electrodes), similar to the example electrode geometries described above in connection with FIGS. 1-2.

It is noted that the voltage supply 320 may generally be a power supply configured to output AC or DC voltages or currents sufficient to apply a polarizing voltage to the electrodes 342. For convenience in the description herein, the module 320 is therefore referred to as "voltage supply," although some embodiments may employ current supplies and/or other electrical power supplies. For example, current supplies may be tuned to provide suitable currents for generate desired polarizing voltages at the electrodes.

The gripping surface 340 of the platform gripper 330 can be coupled to a backing 332 or other support structure, which can be a rigid or semi-rigid structure used to distribute loads on the platform 330 caused by items loaded thereon. The backing 332 or other support structure can additionally or alternatively convey stress forces from such loads to a load-bearing structure such as a control arm, a lifting arm of a hoist, a track of a conveyor system, etc. The platform gripping surface 340 may be connected to both the backing 332 through a deformable layer (e.g., the deformable layer 333 in FIG. 3D). For example, a deformable layer may be included in the backing 332 or situated between the backing 332 and the gripping surface 340 to provide sufficient flexibility between the backing 332 and the gripping surface 340 to allow the gripping surface 340 to at least partially wrap around (i.e., conform) to the exterior surface of items loaded on the surface 340. Such a deformable layer may optionally be connected substantially continuously across the electroadhesive gripping surface 340 and the backing 332. In such an example, the platform surface 340 can therefore be a conformable surface and the electrodes 342 can be configured to provide sufficient flexibility to allow for the gripping surface 330 to conform to exterior surfaces of any loaded items. In addition to facilitating conformal electroadhesion of the gripping surface 340, the deformable layer can also distribute compressive forces caused by items loaded on the gripping surface 340 to the backing 332.

The backing 332 can also optionally include an electrical insulating layer situated between the electrodes 342 in the platform gripping surface 340 and any conductive components in the backing 332 (or related support structure), such as support members, etc. Such an insulating layer can thus provide an electrical buffer to prevent discharge of the electrodes 342. The backing 332 or support structure can also include (or be connected to) a positioning system 322 configured to move the platform 330 to a desired location. For example, the platform 330 can be connected to, or be included in, a lifting arm of a mobile hoist (e.g., a forklift or pallet handler) or a horizontal platform attached to such a hoist. Such a positioning system 322 can be used to transport ("convey") the platform 330 from one place to another while the platform 330 is loaded with one or more foreign objects, which may be electroadhesively attracted to the platform 330 via the gripping surface 340. The positioning system 322 can thus be used to manipulate the platform 330 in a variety of different ways so as to move items loaded on the manipulated platform 330 to a desired location. In some examples, the positioning system 322 may include one or more positioning motors (e.g., servo motors, stepper motors, and the like) for controlling the three-dimensional location of the platform 330 (e.g., position in xyz coordinate space) and/or orientation (e.g., rotation angle and/or tilt angle).

The controller 310 can include electronics and/or logic implemented as hardware and/or software modules to control operation of the platform gripping system 300. For example, the controller 310 can include a voltage supply interface 314 for controlling the voltage supply 320 whether to apply voltage to the electrodes 342 of the gripping surface 340. The voltage supply interface 314 may be configured to operate a switch (or switches) connecting the output of the voltage supply 320 to the terminals 344 of the gripping surface 340 (or perhaps switches within the voltage supply 320). Moreover, the voltage supply interface 314 may specify a magnitude of voltage to be applied to the electrodes 342. The voltage supply interface 314 may send instructions to the voltage supply 320 to cause the voltage supply 320 to adjust the magnitude of voltage output to the terminals 344. Upon receiving instructions, the voltage supply 320 can be configured to apply the specified voltage to conductive wires or lines connected to the terminals 344. The applied voltage can be a DC voltage, which can provide opposing polarity on the electrodes 342 in the gripping surface 340 and thereby cause the gripping surface 340 to induce corresponding polarization in a foreign object loaded on the gripping surface 340. The polarized electrodes 342 and corresponding induced polarization of the loaded object results in an electroadhesive attraction between the gripping surface 340 and the foreign object. Using the voltage supply interface 314 to cause the voltage supply 320 to apply voltage to the terminals 344 can thus be considered turning on the electroadhesive platform gripping system 300. Similarly, causing the voltage to cease being applied to the terminals 344 (e.g., by turning off or disconnecting the voltage supply 320, or reducing the magnitude of the applied voltage, etc.) can be considered turning off the electroadhesive platform gripping system 300.

The controller 310 may also include a positioning interface 316 configured to control the position of the platform 330 via instructions to the positioning system 322. For example, the controller 310 can instruct one or more position motors (e.g., servo motors or the like) in the positioning system 322 to adjust the position of the backing 332 and/or related support structure. The backing 332 is coupled to the gripping surface 340, so the positioning interface 316 can be used to control the location and/or orientation of the platform 330.

The controller 310 may also include an item sensor 312. The item sensor 312 can include one or more sensors and/or detectors configured to output data indicative of a loading condition of the platform 330. For example, the item sensor 312 may detect whether any foreign objects are loaded on the platform 330 by detecting changes in weight, capacitance, opacity, thermal strain, etc. The item sensor 312 can then output data indicating that an item is detected, and the receive indication can be used by the controller 310 to determine instructions to send to the voltage supply 320 and/or positioning system 322. For example, the controller 310 can determine a voltage to be applied to the electrodes 342 (and/or whether to apply such a voltage) based on indication(s) from the item sensor 312.

The item sensor 312 may additionally or alternatively recognize an identifying and/or characterizing feature of any items loaded on the platform 330, and output information indicative of the identifying feature. For example, the item sensor 312 may include a scanner for recognizing images and/or characters appearing on particular items, such as barcode patterns, serial numbers, etc. The item sensor 312 may also include a scanner for recognizing characteristic radiation signatures, such as a characteristic response signal from a radio frequency identification chip (RFID). Moreover, the item sensor 312 may include an image capture and recognition system configured to recognize and/or characterize items on the basis of pattern recognition using one or more images of such items. Additionally or alternatively, identifying systems may include (or communicate with), for example, vision systems configured to capture images of items and recognize symbols, characters, patterns (e.g., barcodes, QR codes, and the like) on such items, shape, reflectivity, dimensions, and/or color of the items; receiver systems configured to receive wireless signatures of such items (e.g., RFID signals and the like); infrared imaging systems, ultrasound scanning systems, and other systems configured to detect identifying information about items to be sorted and characterize the items accordingly. Electroadhesion can then be selectively applied to such items on the basis of such identification/characterization to effect sorting on the basis of the item-identifying information.

Upon identifying and/or characterizing a particular item loaded on the platform 330 using data output from the item sensor 312, the controller 310 can then use such item-information to determine instructions to send to one or both of the voltage supply 320 and/or positioning system 322. For example, the controller 310 may tune the voltage applied by the voltage supply 320 to a magnitude suitable for a material property of a loaded item (e.g., composition, etc.). Furthermore, the controller 310 may instruct the positioning system 322 to convey the platform 330 (and thus the item adhered thereto) to a particular delivery location based on item-identifying information (e.g., for a package sorting process, etc.).

Figure 3B:
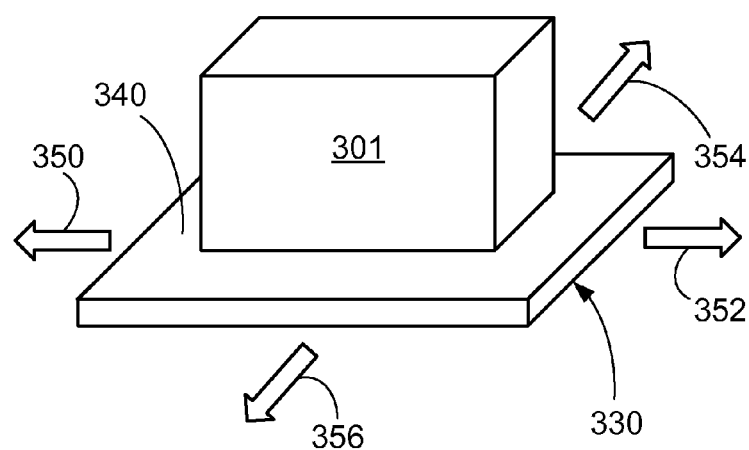
FIG. 3B is a simplified diagram of an example embodiment of the platform gripping system.

FIG. 3B is a simplified diagram of an example embodiment of the platform gripping system 300. The platform 330 is loaded with a box-shaped item 301 resting on its gripping surface 340. The platform 330 can be oriented substantially horizontally such that the item 301 is urged toward the platform 330 by gravity. During translation of the platform 330, however, the platform 330 can be accelerated in one or more directions along the plane of the gripping surface 340, as indicated by the motion indicator arrows 350-356. During acceleration along the plane of the gripping surface 340, the item 301 may slide along the gripping surface, in a direction opposite the direction of acceleration of the platform 330. Absent any electroadhesive attraction, the extent of such slippage (or other relative motion), if any, depends on the friction force between the bottom surface of the item 301 and the gripping surface 340. When the platform 330 is turned on, the resulting electroadhesive attraction between the item 301 and the gripping surface 330 supplements the friction force to resist slippage. The electroadhesive platform 330 can be used to electroadhesively attract the item 301 to the gripping surface 340 during acceleration of the platform 330. The local attraction between the bottom of the item 301 and the gripping surface 340 can thus supplement the force of friction to urge the item to resist sliding (or otherwise being displaced from it starting position) during acceleration of the platform 330. Moreover, the electroadhesive attraction between the item 301 and the platform 330 can be used to urge the item 301 to resist slipping and/or lifting away from the gripping surface 340 during vertical acceleration of the platform 330 (e.g., accelerating along a normal direction of the gripping surface 340). In some embodiments, the platform gripping surface 340 may not be a continuous surface, but may have cutouts in it, similar to the prongs of a forklift commonly used in material handling or another mobile hoist with one or more prongs or lifting arms. Some examples may include mobile hoists with two lifting arms (as on a forklift) although some examples may include more than two lifting arms.

The controller 310 (not visible in FIG. 3B) causes the electrodes 342 in the gripping surface 340 to be polarized by the power supply 320. Opposing polarity voltages can be applied to the electrodes 342 sufficient to induce a complementary local electrical polarization on the bottom surface of the box-shaped item 301. While the voltage is applied to the electrodes 342, the platform gripper 330 can then be used to lift, move, position, place, or otherwise manipulate the item 301. Once moved/positioned to a desired location, the item 301 can then be released from the gripping surface 340 by reducing the voltage applied to the electrodes 342 (e.g., turning the voltage off). For example, the controller 310 can turn electroadhesion on during acceleration of the platform 330 such that the item 301 is attracted to the gripping surface 340 while the platform 330 accelerates (e.g., via manipulation by the positioning system 322). Similarly, the controller 310 may turn electroadhesion off such that the item 301 slides (or otherwise moves) from the gripping surface 340 to land at a predetermined delivery location.

As a result of the attraction, the item 301 resists moving (e.g., sliding, tumbling, rolling, etc.) with respect to the platform 330. Thus, while the platform 330 is in motion, the item 301 can substantially track a path of motion of the platform 330. Moreover, even while the platform 330 is not moving (i.e., static), the electroadhesive attraction can cause the item 301 to resist moving relative to the platform 330. In some examples, the platform 330 may be inclined such that gravitational forces on the item 301 urge the item to slide, tumble, or otherwise move with respect to the surface of the platform 330. The electroadhesive attraction may therefore overcome inertial, centrifugal, and/or gravitational forces (or torques) on the item 301 to cause the item to remain substantially secured to the platform 330 even in the presence of external forces. Further still, the platform 330 may operate to slow and substantially secure the item 301 after the item 301 is received with some inertia, relative to the inertial reference frame of the platform 330. In general then, the platform 330 can operate to electroadhesively adhere to the item 301 such that the item 301 substantially tracks ("follows") the inertial reference frame of the platform 330, which may be in motion or not. The electroadhesive attraction may thus cause the item 301 to depart from an initial inertial path and/or overcome one or more forces (including torques) acting on the item 301 to urge the item 301 to slide, tumble, roll, or otherwise move with respect to the platform 330.

The platform 330 can additionally or alternatively operate to allow the item 301 to detach from the platform 330 by reducing the electroadhesive attraction (e.g., turning off the electroadhesion). Upon deactivation of the electroadhesive attraction, the item 301 may move in accordance with such other forces acting on it to, for example, move relative to the platform 330 (e.g., by sliding, tumbling, rolling, etc.). For example, upon deactivation (or reduction) of the electroadhesive attraction, the item 301 may move along a path defined by gravity, inertia, and/or other external forces. In the absence of the electroadhesive attraction (e.g., in response to a reduction of such attraction), the item 301 can detach from the platform 330 so as to move along a trajectory defined in part the item's inertia and/or external forces such as gravity, etc. The item 301 can thus depart from the platform 330 and be delivered to a designated delivery area.

Figure 3C:
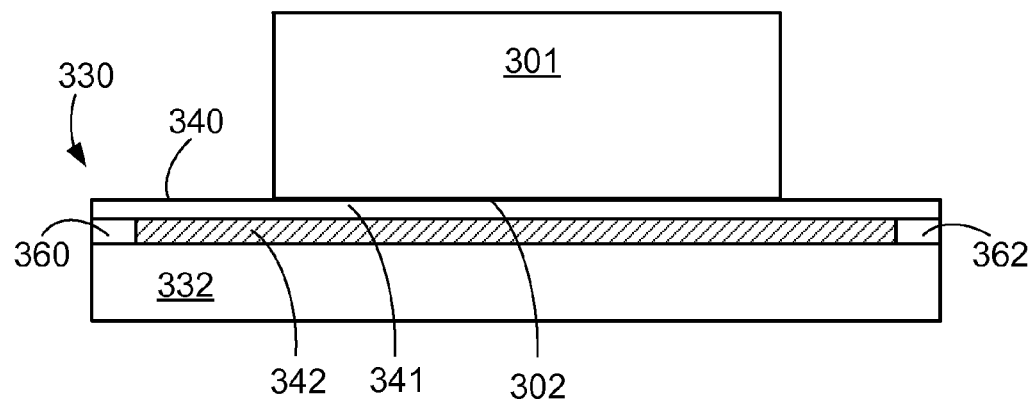
FIG. 3C is a side cross-section view of the example electroadhesive platform.

FIG. 3C is a side cross-section view of the example electroadhesive platform 330. The backing 332 can be a rigid or semi-rigid structure that receives the load of the item 301 loaded on the gripping surface 340. The backing 332 can convey and/or distribute the force of such load to a related support structure, such as a control arm, a lifting arm of a mobile hoist, a surface of a conveyor system, etc. The backing 332 may include non-conductive materials in order to prevent electrical discharge of the electrodes 342. Additionally or alternatively any conductive materials in the backing 332 and/or related support structure, such as metallic support members, etc., can be separated from the electrodes 342 with an insulating layer disposed between the two. Furthermore, the electrodes 342 can be covered by a coating layer 341 that forms the outer surface of the gripping surface 340. The coating layer can be an insulating material that both protects the electrodes 342 from mechanical disruption and prevents incidental discharge of the electrodes 342 (e.g., due to conductive materials placed on the gripping surface 340). Similarly, the outer side edges of the platform 330 can include insulating materials 360, 362 to electrically insulate the conductive electrodes 342 from incidental discharge and/or damage. When the item 301 is loaded on the platform 330 its bottom surface 302 contacts the coating layer 341 defining the gripping surface 340. Polarization of the embedded electrodes 342 induces a corresponding local polarization of the box-shaped item 301 along its bottom surface 302, and the item 301 is thereby attracted to the platform 330.

Figure 3D:
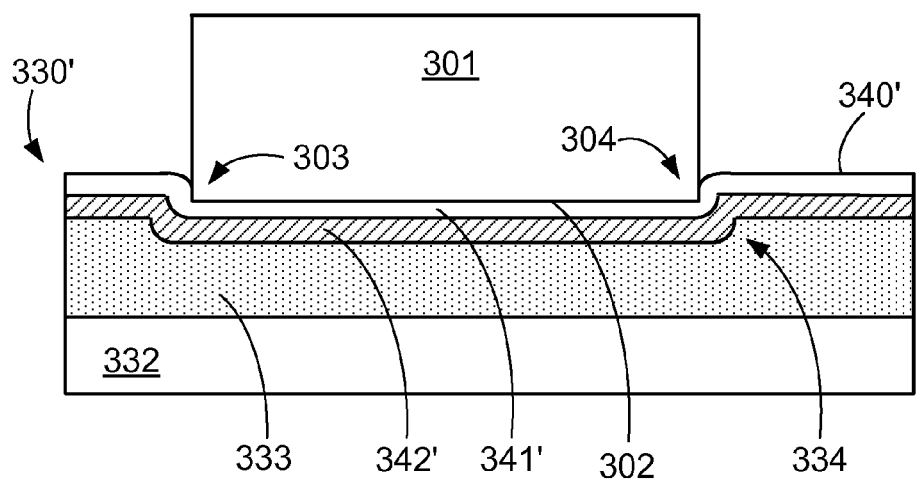
FIG. 3D is a side cross-section view of another electroadhesive platform gripper that includes a conformable electroadhesive surface.

FIG. 3D is a side cross-section view of another electroadhesive platform gripper 330' that includes a conformable electroadhesive surface 340'. The platform gripper 330' includes a deformable layer 333 disposed between the backing 332 (or related support structure) and the conformable electroadhesive surface 340'. The deformable layer 333 can be formed of an encapsulated gel material, a deformable polymeric material, or another material deformable material. Flexible electrodes 342' and a flexible outer coating 341' can then be coupled to the deformable layer to create the flexible gripping surface 340'. The flexible electrodes 342' may be formed of a flexible conductive material disposed on or within a suitable substrate, for example. The deformable layer 333 is configured to at least partially deform upon the item 301 being loaded on the conformable platform 330', such that the conformable gripping surface 340' at least partially wraps around (i.e., conforms) to the exterior surface 302 of item 301. For example, as shown in FIG. 3B, the deformable layer 333 can indent (334) to absorb corresponding ridges, corners, etc. (e.g., the corners 303, 304) in the bottom surface 302 of the item 301. The deformation of the deformable layer 333 allow the flexible gripping surface 340' disposed thereon to conform to the surface features of the bottom surface 302 (e.g., to at least partially wrap around the corners 303, 304). The conformable gripping surface 340' can thus provide a greater amount of surface area contact with the bottom surface 302 than can be achieved by a rigid planar electroadhesive gripping surface (e.g., the gripping surface 340 in FIG. 3C). Additionally or alternatively, the deformable layer 333 can also distribute compressive forces from the gripping surface 340' to the backing 332. For example, the deformable layer 333 can distribute the downward force of items resting on a particular location of the gripping surface 340' to a relatively greater area of the backing 332.

Figure 3E:
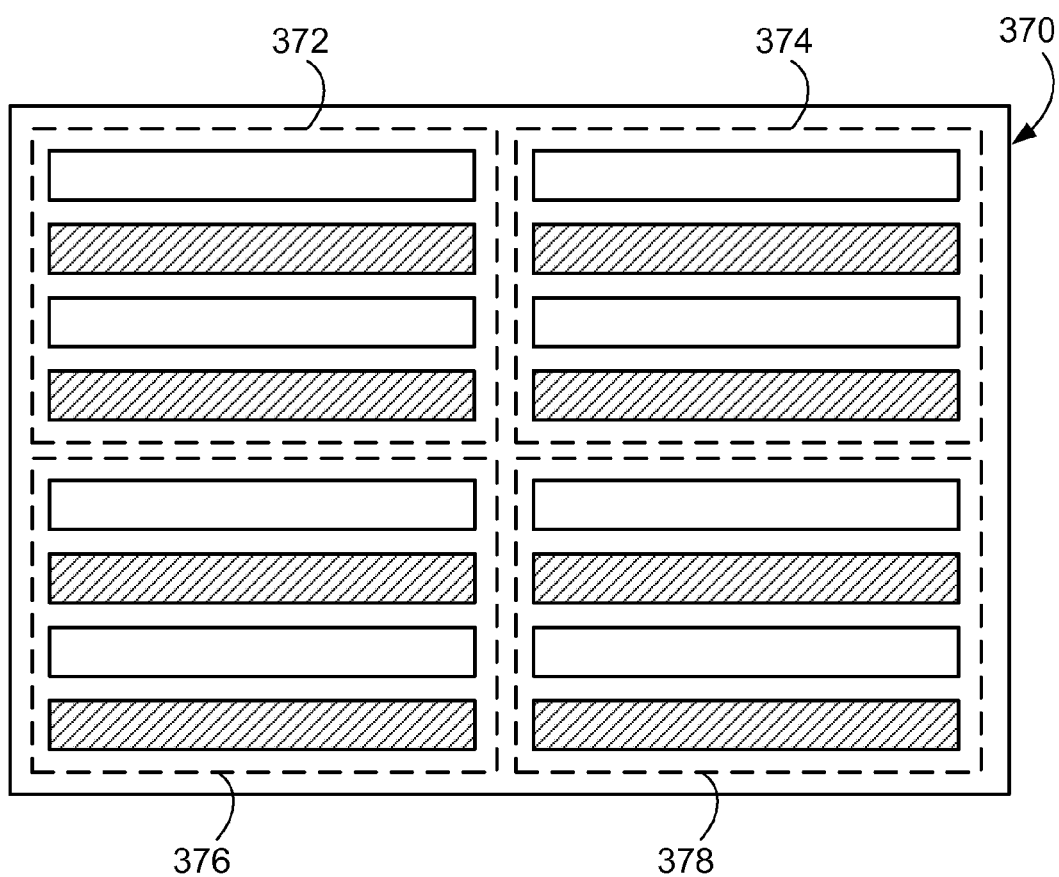
FIG. 3E is a top view of an electroadhesive platform gripper with separately addressable regions.

FIG. 3E is a top view of an electroadhesive platform gripper 370 with separately addressable subsections 372-378. The gripping surface of the platform gripper 370 is divided into distinct, non-overlapping areas or subsections. Each subsection includes a set of electrodes configured to be charged with opposite polarity voltages to induce an electroadhesive response in an object loaded on the platform 370. For convenience in the description and illustration of the opposite polarity electrodes in FIG. 3E, electrodes configured to receive a positive voltage from the voltage supply (e.g., positive polarity electrodes) are illustrated with a hatch pattern. Electrodes configured to receive a corresponding negative voltage from the voltage supply (e.g., negative polarity electrodes) are illustrated without a hatch pattern to make the pattern of alternating polarity electrodes readily apparent. As shown in FIG. 3E, each of the subsection can include alternating opposite polarity electrodes. The alternating polarity electrodes in each subsection can optionally be interdigitated, although a variety of electrode geometries may be used.

Each of the subsections 372-378 can have a pair of separate terminals to connect the respect electrodes in the subsection to the voltage supply. The connection to each subsection-specific set of terminals can then be separately controlled to allow the various subsections to be controlled separately. For example, the two subsections shown on the left-hand side of the platform 370 (e.g., the subsections 372, 376) can be turned on while the remaining subsections 374, 378 can be turned off. Moreover, the controller and/or voltage supply can provide apply different polarizing voltages to different subsections. For example, subsection 372 may receive a 6 kV voltage while subsection 374 may receive a 2 kV voltage. Moreover, which subsection(s) to turn on, if any, and/or the magnitude of voltage(s) to apply can be determined dynamically based at least in part on sensor data (e.g., from the item sensor 312). For example, voltage may be selectively applied to those subsection(s) loaded with items as indicated by weight measurements, opacity measurements, surface capacitance, thermistor-based strain slip sensor, etc. Further still, the amount of voltage to apply to each subsection can be determined in part based on an indication of the type of objects loaded on the platform 370. For example, one voltage may be applied for an object with a cardboard exterior, while another is applied for a shrink wrap encased object.

By separately addressing different polarizing voltages to different subsections of the electroadhesive platform 370, the platform 370 can be operated with relatively greater energy efficiency than non-addressable platforms. In some examples, the separately addressable platform 370 only applies voltage to those regions of the platform 370 loaded with items, and thereby conserves power with respect to the unpowered subsections.

Figure 4:
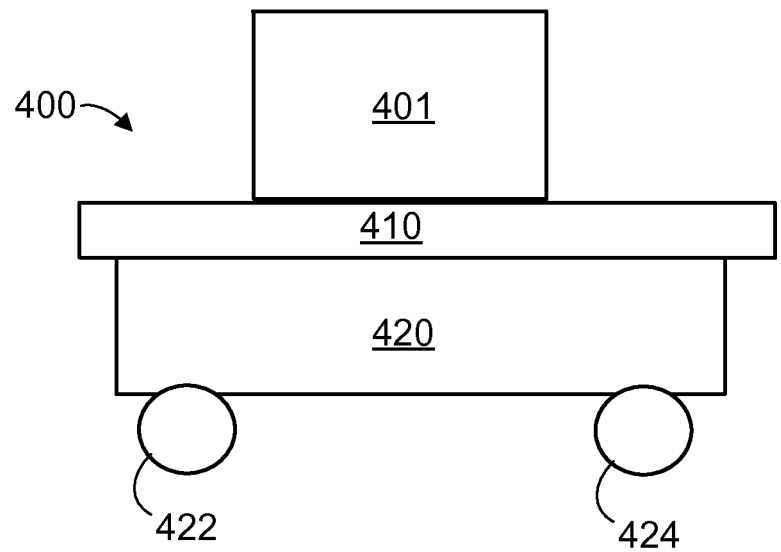
FIG. 4 illustrates a side view of an example cart including an electroadhesive platform.

FIG. 4 illustrates a side view of an example cart 400 including an electroadhesive platform 410. The cart 400 includes a chassis 420 situated on wheels 422, 424. The electroadhesive platform 410 can be similar to the electroadhesive platform 300 described in connection with FIG. 3. The platform 410 can include an arrangement of electrodes configured to be polarized to induce an electroadhesive attraction with items loaded thereon. The platform 410 can also include a backing and/or support structure suitable for mounting to the chassis 420.

The platform 410 can be loaded with an item 401 (e.g., a box, pallet, or other object to be conveyed). The electroadhesive platform 410 can then activate electroadhesion to fix the item 401 on the platform 300 (e.g., by applying voltage to electrodes integrated in a gripping surface of the platform 410). While electroadhesion is activated, the cart 400 can move from one place to another. For example, the cart 400 can accelerate along a direction parallel to the plane of the platform 410 by movement of the wheels 422, 424. The item 401 remains in position on the platform 410 due to the electroadhesive attraction (and also due to friction). As such, the platform 410 can operate to electroadhesively secure the item 401 during movement of the cart 400 without guard rails or tie downs. The cart 400 can therefore be operated at greater speeds and/or accelerations without the item 401 slipping from the platform 400. Additionally, items 401 can be loaded onto the cart 400 and secured for transport very quickly by simply activating the electroadhesive platform 410, as opposed to mechanically securing items with tie downs or the like. Moreover, the cart 400 can be operated with greater safety and efficiency, because items 401 resist sliding off and/or falling from the platform 410 or otherwise moving while the electroadhesive platform 410 is activated.

The chassis 410 may optionally include extendable portions, such as scissor-type jacks, telescoping components, etc. which may be hydraulically driven. For example, the chassis 420 can be included in a mobile hoist (e.g., a pallet loader, forklift, etc.). The electroadhesive platform 410 can be situated on (or integrated with) one or more lifting arms of such a hoist.

Figure 5:
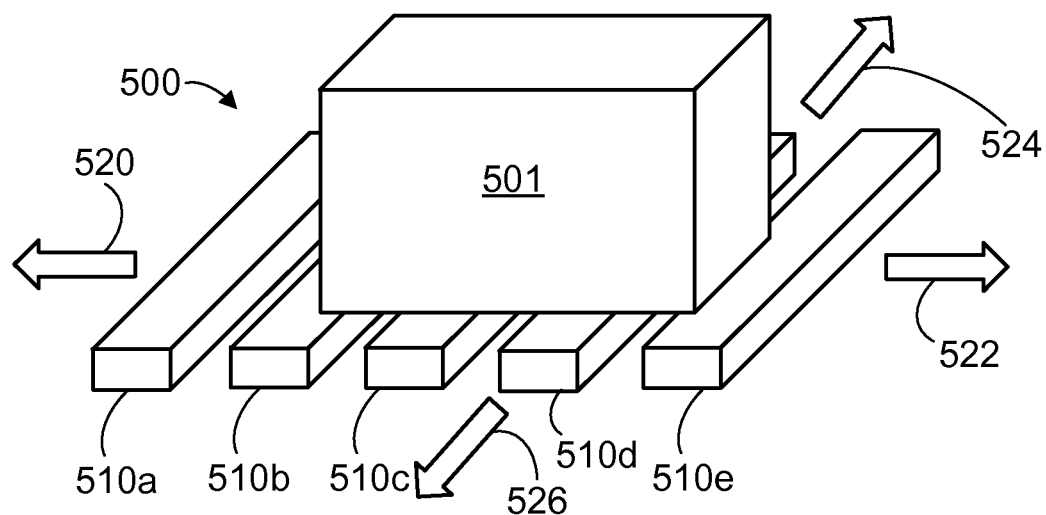
FIG. 5 illustrates an example segmented electroadhesive platform with a plurality of lifting arms that jointly lift an item disposed thereon.

FIG. 5 illustrates an example segmented electroadhesive platform 500 with a plurality of lifting arms 510a-e that jointly lift an item 501 disposed thereon. The electroadhesive lifting arms 510 can each be similar to the electroadhesive platform 300 described in connection with FIG. 3. The plurality of lifting arms 510a-e can each have a pattern of electrodes to induce an electroadhesive response in the item 501 situated on the top surface of the respective lifting arms 510*a-e*. Each of the lifting arms 510*a-e* can each be separately addressable by an associated voltage supply or one or more of the lifting arms 510*a-e* can be jointly addressed. The lifting arms 510*a-e* can each be connected to a support structure, such as a mobile hoist or another control arm or support structure configured to manipulate the item 501 loaded on the lifting arms 510*a-e*. During acceleration of the item 501 along a direction parallel to the plane of the lifting arms 510*a-e* (e.g., as indicated by the directional arrows 520-526), the electroadhesive attraction between the lifting arms 510*a-e* and the bottom surface of the box 501 secures the box 501 in place on the lifting arms 510*a-e*. The electroadhesive lifting arms 510*a-e* can thus urge the box 501 to resist slipping on the control arms 510*a-e* while the lifting arms 510*a-e* are moving to manipulate the location and/or orientation of the box 501.

The lifting arms 510*a-e* can be used in a mobile robot for handling packages, such as cardboard boxes, pallets, etc. in a warehouse environment. In such an example, the multiple lifting arms 510*a-e* can be inserted into corresponding channels in warehouse shelving. As such, the dimensions and/or spacing between adjacent ones of the lifting arms 510*a-e* may be selected to accommodate particular shelving configurations.

3b) Example Electroadhesive Conveyor Belt

Figure 6A:
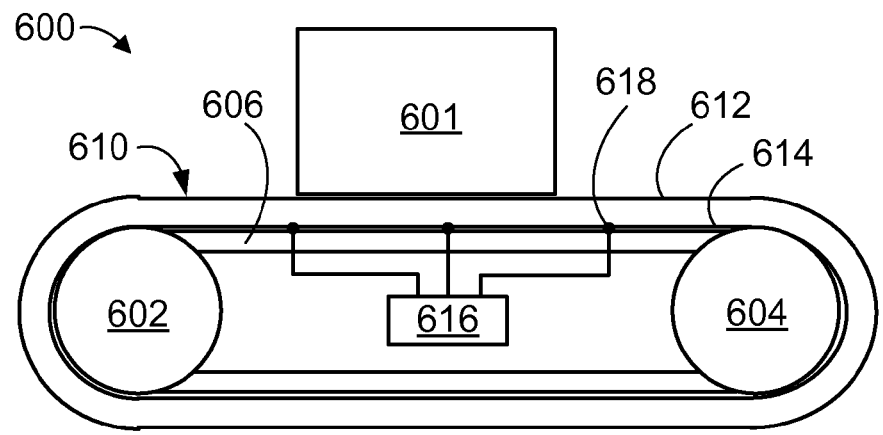
FIG. 6A illustrates a side view of an electroadhesive conveyor system.

FIG. 6A illustrates a side view of an electroadhesive conveyor system 600. The conveyor system 600 includes a conveyor belt 610 that wraps around two pulleys 602, 604 and a track 606, in a continuous loop of material. The pulleys 602, 604 can rotate to cause the belt 610 to move along the track 606. For example, the pulleys 602, 604 can be connected to a driving system which rotates an axle of one or both pulleys 602, 604 to cause the pulleys 602, 604 to rotate in a desired direction and/or speed. The pulleys 602, 604 interface with an inner surface 614 of the belt 610 to thereby urge the belt 610 to move along the track 606. To facilitate frictional interaction between the inner surface 614 and the pulleys 602, 604, the belt length and/or pulley position(s) can be selected such that the belt 610 is pulled taught across the pulleys, which can thus decrease slippage between the belt 610 and the pulleys 602, 604. When in motion, an outer surface 612 of the belt 610 can be used to convey item(s) resting thereon along a path defined by the belt 610. As shown in FIG. 6A, an item to be conveyed 601 rests on the outer surface 612 of the belt 610. The item 601 can be a box, package, parcel, container, etc., such as those encountered in warehousing and/or package handling facilities, for example. The track 606 may include idler rollers that roll freely, for example, to allow the belt 610 to move along the track 606 with relatively low resistance. Additionally or alternatively, driven rollers may be included along the track 606 to be used in urging the belt 610 along the track 606.

When the belt 610 is driven by the pulleys 602, 604, the outer surface 612 of the belt 610 translates along the track 606 to thereby convey the item 601 along a path defined by the belt 610. Absent slippage, the rotational motion of the pulleys 602, 604 can thus be used to convey the object 601 on the outer surface 612 of the belt 610. However, the operation of the conveyor system 600 to convey the item 601 is generally limited by frictional forces between the item 601 and the outer surface 612 of the belt 610. Particularly in scenarios in which the belt 610 is used to accelerate the item 601 (e.g., to turn around a corner, to move along an incline, to speed up and/or slow down, etc.), the item 601 slips off of the belt 610 in the absence of sufficient frictional attraction between the belt 610 and the item 601. Some embodiments of the present disclosure therefore provide for using electroadhesion to secure items (e.g., the box 601) being conveyed on the conveyor belt 610.

Figure 6B:
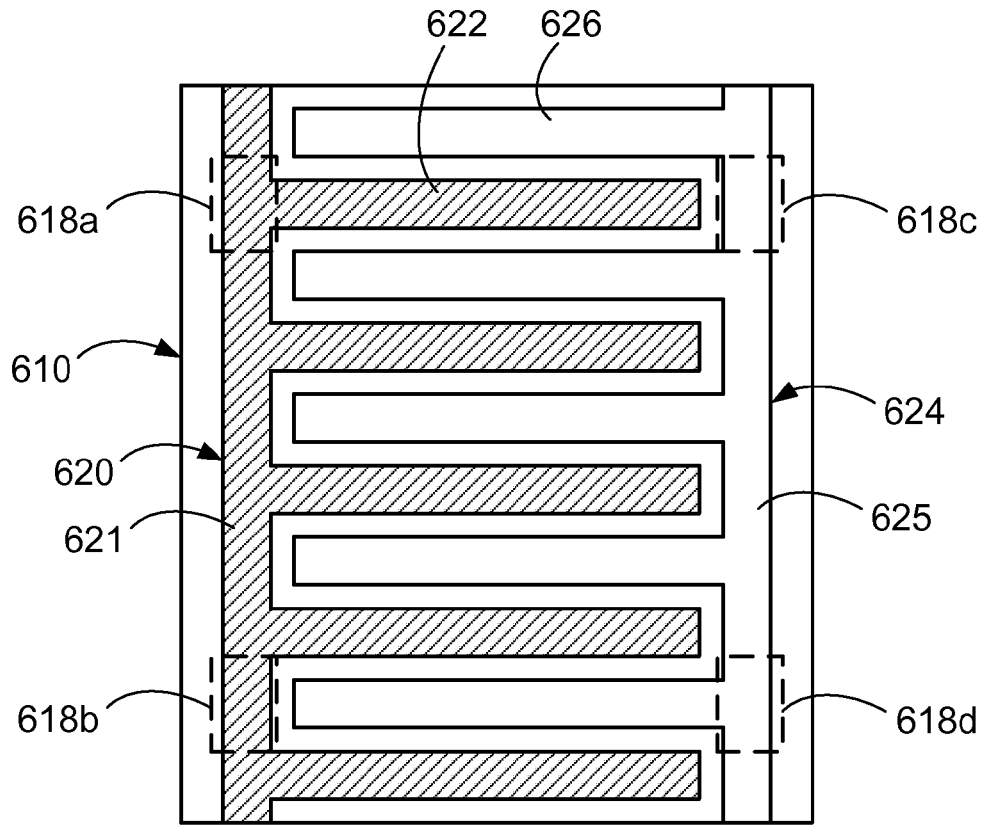
FIG. 6B illustrates a top view of the electroadhesive conveyor belt with electrodes exposed for view.

The belt 610 can thus include one or more electrodes disposed on or within the belt 610 to induce an electroadhesive attraction between the belt 610 and item(s) being conveyed by the belt 610. FIG. 6B illustrates a top view of the electroadhesive conveyor belt 610 with electrodes 620, 624 exposed for view. The electrodes 620, 624 can be embedded between insulating outer and inner layers (632, 634 in FIGS. 6C-6E) forming the outer and inner surfaces 612, 614, respectively. For example, the outer layer can be formed of a polymeric material and/or other flexible materials with suitable tensile strength to be circulated around the pulleys 602, 604 while under tension. The outer layer may include, for example, a rubberized surface that interfaces with the item 601 placed thereon via frictional forces. Moreover, such inner and outer layers may protect the electrodes 620, 624 from mechanical disruption (e.g., a puncture, tear, etc.) and also prevent discharge of the electrodes 620, 624 via direct contact between the electrodes 620, 624 and any conductive materials placed on the belt 610.

Figure 6C:
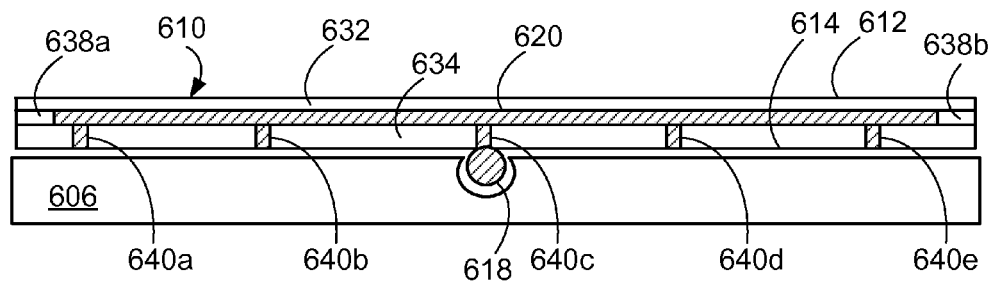
FIG. 6C illustrates a side cross-section of an electroadhesive belt with an electrode disposed therein that is non-continuously connected along the length of the belt.
Figure 6D:
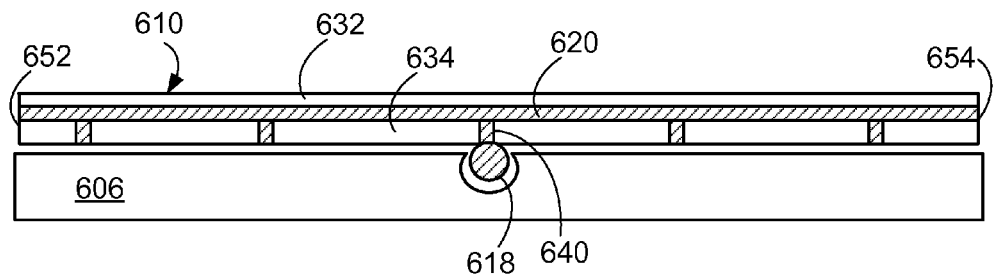
FIG. 6D illustrates a side cross-section of an electroadhesive belt with an electrode disposed therein that is continuously connected along the length of the belt.
Figure 6E:
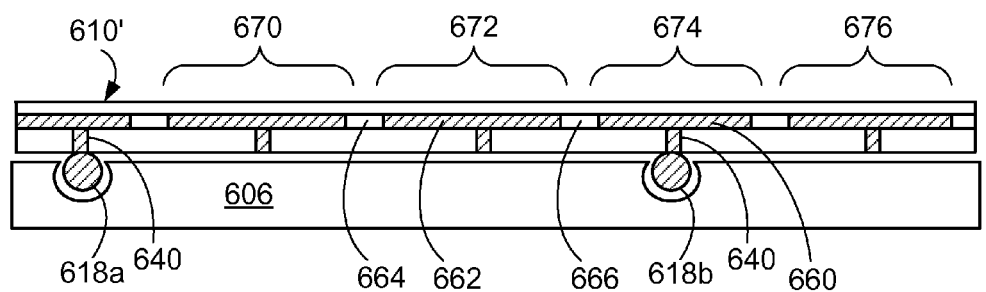
FIG. 6E illustrates a side cross-section of an electroadhesive belt with segmented, separately addressable electrodes disposed therein.

The electrically insulating inner and outer layers of the belt 610 (which layers are also shown in FIGS. 6C-6E) can thus combine to substantially encapsulate the electrodes 620, 624. However, electrical connection between the electrodes 620, 624 and a suitable voltage supply is necessary in order to apply a polarizing voltage to the electrodes, which then induces an electroadhesive response in the item 601. Some embodiments of the present disclosure therefore provide for rolling high voltage contacts 618 that connect to terminals on the inner surface 614 of the belt 610. The terminals along the inner surface 614 connect to the electrodes 620, 624 through conductive vias that pass through the inner insulating protective layer. The rolling electrical contacts 618 can be implemented as a rolling cylinder or wheel with an electrically conductive outer wall. The outer wall of the rolling contact 618 receives voltage from a high voltage supply (e.g., conveyed through an axle, slip ring, and/or sliding contact(s) to charge the outer edge of the rolling contact 618). Additionally or alternatively, high voltage supplied to the conductive outer wall of the rolling contacts 618 can be generated inside the rolling cylinder itself. For example, the cylinder can house voltage conversion electronics (e.g., transformers, diodes, etc.) that generate an appropriate high voltage output from a low voltage conveyed through an axle, slip ring, and/or sliding contact(s).

The rolling contacts 618 can rotate on axles at fixed locations along the track 606. The rolling contacts 618 can thus be similar to an idle roller used to facilitate transport of the belt 610 along the track 606, except that the outer edges of the rolling contacts 618, which contact the inner surface 614 of the belt, can be charged to a voltage. As the belt 610 moves over the rolling contacts 618, the rolling contacts 618 connect to new positions along the inner surface 614 of the belt 610. As noted above, the inner surface 614 includes an arrangement of terminals positioned to meet the rolling contacts 618 as the belt 610 moves. Upon contact with a terminal, a given one of the rolling contacts 618 applies a voltage to the electrode 620 connected to the terminal, through a conductive via (640 in FIGS. 6C-6E). In other words, the terminals along the inner surface 614 (and corresponding vias) connect the voltage from the rolling contacts 618 to the electrodes 620, 624 within the belt 610. Such terminals (and corresponding vias) can be spaced intermittently along the length of the belt 610, such that adjacent ones of the terminals contact a given rolling contact 618 in series as the belt moves 610 along the track 606.

A controller 616 can control the voltage applied to the rolling contacts 618 (e.g., by controlling a high voltage supply, similar to the controller 510 in the curtain gripping system 500). The controller 616 may therefore be connected to the rolling contacts 618 or may control (e.g., regulate) an electrical connection between a high voltage supply and the rolling contacts 618. It is noted that the voltage supply controlled by the controller 510 may generally be a power supply configured to output AC or DC voltages or currents sufficient to apply a polarizing voltage to the rolling contacts 618. Further, the AC or DC voltage or current conveyed to the rolling contacts 618 may be converted to a suitable high voltage suitable for electroadhesion by electronics within the rolling contacts 618. Moreover, the controller 616, which can include a combination of hardware and/or software implemented modules configured to carry out various processes described herein, can also control operation of the conveyor driving system (e.g., the driving system for the pulleys 602, 604). Thus, in some examples, the controller 616 can operate to control both the movement of the belt 610 (e.g., by causing the pulleys 602, 604 to rotate) and the electroadhesive force between the conveyed item 601 and the belt 610 (e.g., by applying voltage to the rolling contacts 618).

As shown in FIG. 6B, the pattern of electrodes within the belt 600 can include a first electrode 620 and a second electrode 624. For example, the first electrode 620 can be configured to be charged to a positive voltage relative to the second electrode 624. For convenience in notation and explanation only, the first electrode is alternately described herein as a positive electrode, and is illustrated with a cross-hatching to allow the first electrode to be readily distinguished from the second electrode, which is shown without cross-hatching. Similarly, the second electrode is alternately referred to as a negative electrode. Referring again to FIG. 6B, the first electrode 620 can include a lengthwise side rail 621 that extends along the length of the belt 610, and can be substantially parallel to one side of the belt 610. The second electrode 624 can include a lengthwise side rail 625 that extends along the length of the belt 610, and can be substantially parallel to another side of the belt 610.

The electrodes 620, 624 can also include an arrangement of interdigitated alternating electrodes 622, 626, which can extend from the respective side rails 621, 625. The interdigitated electrodes are situated such that opposite polarity electrodes are adjacent one another, in an alternating fashion. The interdigitated electrodes 622, 626 can extend within the belt at least partially transverse to the respective side rails 621, 625 (e.g., across the width of the belt, rather than the length). As such, the center portion of the belt 610 can include the alternating electrodes 622, 626 and the regions near the opposite side edges can include the two side rails 621, 625. The two regions near the side edges thus form a substantially continuous strip of the belt 610 that are associated with a given one of the opposite polarity voltages (rather than both).

In some embodiments, given ones of the rolling contacts 618 can be associated with a given one of the opposite polarity voltages used to polarize the electrodes 620, 624. The rolling contacts 618 can therefore be positioned to overlap the regions of the belt 610 including the respective side rails 621, 625. For example, the two rolling contacts 618a, 618b can each be charged with a positive voltage and be situated along the track 606 at a location beneath the side rail 621 for the positive electrode 620. Similarly, the two rolling contacts 618c, 618d can each be charged with a negative voltage and be situated along the track 606 at a location beneath the side rail 625 for the negative electrode 624. Conductive vias can extend from the side rails 621, 625, through an inner protective layer of the belt 610, to corresponding terminals along the inner surface 614 of the belt 610. As the belt 610 rolls along the rolling contacts 618, the terminals contact the rolling contact 618 to apply the positive/negative voltages to the positive/negative electrodes 620, 624, through the vias.

When the polarizing voltages are applied to the terminals 620, 624 within the belt 610, the item 601 has induced an induced electroadhesive response, which attracts the item 601 to the belt 610. The force holding the item 601 to the belt 610 is thereby increased (e.g., the induced electroadhesive force supplements the friction interaction between the outer surface 612 of the belt 610 and the outer surface of the item 601. The increased holding force between the item 601 and the belt 610 allows the conveyor system 600 to be operated at increased speeds and/or accelerations, without the item 601 slipping off of the outer surface 614.

FIG. 6C illustrates a side cross-section of an electroadhesive belt with an electrode disposed therein that is non-continuously connected along the length of the belt 610. The electrode 620 is situated between an outer layer 632, which forms the outer surface 612, and an inner layer 634, which forms the inner surface 614. A series of vias 640a-e electrically connect the electrode 620 to the inner surface 614, and thereby connect the electrode 620 to the rolling connector 618 (e.g., through the via 640c). As the belt 610 moves along the rail 606, another one of the vias contacts the rolling connector (e.g., the via 640b or 640d, depending on direction of belt motion).

In between each connection with the rolling contact, the electrodes substantially maintain the voltages via the internal capacitance in the pattern of electrodes. In some examples, the separation distance between adjacent ones of the vias 640a-e can be selected based on factors including belt speed, spacing between the rolling contacts 618, ability to cut the belt and then make a seam to make arbitrary overall belt lengths, and capacitance of the electrode pattern, such that the amount of variation in the polarization voltage between intermittent contacts is within a target range. During operation, the polarization voltage varies due to alternating between discharge while the electrode 620 is disconnected from any of the rolling contacts 618 (while the rolling contact 618 is between vias 640) and charging while the electrode 620 is connected to at least one of the rolling contacts 618. Moreover, the surface area of conductive terminals along the inner surface 614 that are associated with each via 640 can be adjusted (e.g., increased) to allow for longer duration and/or greater frequency connections between the electrode 620 and the rolling connectors 618.

Once assembled, the belt 610 can be formed in a single continuous loop of material that stretches over the pulleys 602, 604. However, during manufacture, the belt 610 may be first assembled as a laminated sheet with the embedded electrodes 620, 624 between the inner and outer layers 632, 634. In other embodiments, the laminated sheet may include its own insulating layer on top of the electrodes that is distinct from the belt outer layer 632. In yet other embodiments, the electrodes may be deposited directly onto the belt inner material 634 through a variety of coating or deposition processes such as screen printing, spraying, laminating or etching, with no separate layer necessary. The belt is then joined together to create a loop. However, joining procedures may not allow for creating an electrical connection between the two ends that are joined. As such, the ends of the belt 610 may commence and terminate with portions 638a, 638b that do not include the conductive electrode 620. An alternative filler material may be inserted in the portions 638, 638b, for example. The respective ends of the belt 610 can then be joined together (e.g., by stitching, fusing, bonding, etc.). The region surrounding the junction is non-electroadhesive due to the interruption of the electrode 610, although such interruption may be confined to a short length of the belt 610, relative to its total length. The resulting electrode 620 may therefore be non-continuously connected along the length of the belt 610.

FIG. 6D illustrates a side cross-section of an electroadhesive belt with an electrode 620 disposed therein that is continuously connected along the length of the belt 610. The laminated sheet used to assemble the belt 610 is constructed with embedded electrodes all the way to the edges of the belt 610. During assembly of the belt 610, the two ends 652, 654 are mechanically joined together, and the two exposed ends of the electrodes are joined electrically as well. For example, the exposed ends of the electrode 620 may be joined by a welding, fusing, and/or annealing process, and/or an electrically conductive material may be used such as solder or a conductive adhesive or gel, or the like. Once the resulting belt 610 is assembled, the electrode 620 can be continuously electrically connected along the entire length of the belt 610.

FIG. 6E illustrates a side cross-section of an electroadhesive belt 610' with segmented, separately addressable electrodes disposed therein. Rather than a single continuous strip, electrodes embedded between the outer and inner layers 632, 634 have a length that only spans a subsection of the total length of the belt 610. As shown in FIG. 6E, the addressable belt 610' can include a first section 670, a second section 672, a third section 674, and a fourth section 676. Each of the section 670-676 can include a distinct electrode (e.g., the electrodes 660, 662) that are not connected to electrodes in adjacent sections. The distinct electrodes in each subsection are each connected to at least one via 640 to connect the respective electrode to a nearest rolling connector 618. As such, the particular subsections 670-676 only have voltage applied (i.e., are only turned on) while the particular subsection passes over a rolling connector 618, which then polarizes the electrodes within the particular subsection. Adjacent subsections can be separated from one another by non-conductive regions to electrically isolate electrodes in adjacent subsections from one another. For example, the non-conductive regions 664, 666 on either side of the electrode 662 of the second subsection 672.

This arrangement can thus be used to allow particular subsections of the addressable belt 610' to exhibit electroadhesive effects on items within the subsection, while other subsections at different areas along the length of the belt 610' do not exhibit electroadhesive attraction. Moreover the electroadhesive effect can be turned on/off (or otherwise tuned) based on the position of a particular subsection 670-676 on the track 606. This is because the electroadhesive attraction by each subsection 670-676 is activated by applying voltage from rolling connectors 618 that remain in a fixed position along the track 606. For example, voltage can be applied to rolling connectors at one portion of the track 606 while no voltage can be applied to rolling connectors at another portion of the track 606. A given subsection of the belt 610' is thus turned on upon a via 640 for the given subsection making contact with the rolling connector 618 charged with a supply voltage. The given subsection can then discharge, and cease electroadhesion, once the subsection is no longer in range of the charged rolling connector 618. Further still, discharging connectors may be included along the path 618 to allow a given subsection to discharge more rapidly (i.e., to discharge the voltage on the internal capacitance of the pattern of electrodes).

The sequence of charging (and associated electroadhesive attraction) followed by discharging (and associated electroadhesive disconnection) is then repeated by each subsection reaching the particular rolling connectors. In continuous operation then, the combined effect is that the belt 610' exhibits electroadhesive attraction along regions of the track 606 with charged rolling connectors 618, and does not exhibit electroadhesive attraction along regions of the track 606 without such connectors (or with discharged connectors). Moreover, by adjusting the voltages applied by various ones of the rolling connectors, the magnitude of electroadhesive attraction can be adjusted at various positions along the track 606. Further still, the voltages (and associated electroadhesive effects) at various positions can be dynamically adjusted in real time to cause the track to exhibit a desired amount of position-dependent electroadhesion. For example, the controller 616 may adjust the voltages supplied by each of the rolling connectors 618 on the basis of a variety of factors to either apply additional electroadhesive attraction (e.g., to ensure a particular item does not detach from the belt 610') and/or to apply reduced electroadhesive attraction (e.g., to allow a particular item to slide off of the belt 610').

IV. Singulation by Electroadhesion

Some embodiments of the present disclosure find application in item handling and processing. For example, a group of parcels/packages may be loaded into an automated handling system to be sorted according to a variety of factors. In some examples, parcels/packages are sorted by automated systems based on identifying information indicated by labels affixed to the packages. Such automated systems may be employed, for example, in sorting/routing systems for luggage and/or parcel handling services. In these and other applications it is useful to distribute items along a conveyor belt (or other conveying platform surface) such that each item is located in an unoccupied region of the belt. In other words, it is often desirable for items to be distributed such that no items are stacked on top of others. Stacked items may create problems for sorting/routing systems configured to sort individual items based on identifying information. For example, items in the low position of the stack may not be perceived by the automated handling system. In some examples, identifying information (such as an adhered label, RFID tag, etc.) may not be visible on items located underneath others. In order to accurately process each item in such sorting/routing systems, each item to be handled is preferably situated on an otherwise unoccupied portion of the conveyor belt (or other conveying platform surface).

FIGS. 7A-7B illustrate a system for achieving singulation of items 701, 702 distributed on an electroadhesive platform 700. The electroadhesive platform 700 can be similar to the electroadhesive platform 300 described above in connection with FIG. 3. FIG. 7A illustrates an example electroadhesive platform 700 that is sloped to distribute stacked items in a single layer. FIG. 7B illustrates the sloped electroadhesive platform shown in FIG. 7A after items are distributed in a single layer. As shown in FIG. 7A, the electroadhesive platform 700 is oriented with its electroadhesive gripping surface 710 tilted, relative to horizontal, by an angle θ. The tilted platform 710 therefore has a high side edge 712 that is elevated relative to a low side edge 714 on the opposite side.

The items 701 and stacked with item 702 on top of item 701. When electroadhesion is activated, the bottom item 701 in the stack is electroadhesively secured to the tilted platform 701, but the top item 702, stacked on top of item 701, is not electroadhesively secured and so it slides off of the bottom item 701, as indicated by the directional arrow 720. The sliding redistributes the top item 702 to an unoccupied portion of the tilted platform 700, as shown in FIG. 7B. Additionally or alternatively, vibration and/or centrifugal forces induced by moving the items 701, 702 around a radius may be used as a method of inducing the top item 702 to slide off of bottom item 701, instead of (or in addition to) tilting and/or orientation change.

V. Example Sorting Systems

Given the ability to selectively adhere to items loaded on electroadhesive platforms by selectively applying voltage to the electroadhesive electrodes of such platforms, sorting systems may be created that use one or more electroadhesive platform grippers to sort a group of intermixed packages. For example, packages in a sorting facility can be recognized/characterized using identifying information on such packages. Packages can then electroadhesively secured to an electroadhesive platform and conveyed toward a designated delivery location for the identified package. The package can then be released while the platform approaches the delivery location by deactivating the electroadhesion. Upon release, the package follows an inertial path (e.g., in a controlled slide) toward the delivery location to thereby deliver the package. Selectively adhering platforms can thus be used to deliver packages situated thereon by releasing packages while the platform decelerates, turns, etc. to allow the package to continue on along an inertial path. Selectively adhering platforms can also be used to release packages to desired locations by tilting the platform such that packages are secured to the platform against gravity. Releasing packages allows the packages to slide from the tilted platform, along a gravity-defined path, and into a desired delivery location.

Generally, any of the electroadhesive platform grippers and/or conveyor belts disclosed herein in connection with FIGS. 1-7 can be used to convey items toward a delivery location then release such items such that the items slide from the gripping platform and into the delivery location. The example sorting systems presented herein include a system using electroadhesive conveyor belts, which may be addressable, similar to those discussed above in connection with FIGS. 6A-6E. However, the examples provided herein are provided for purposes of illustration and example, and not limitation. It is particularly noted that alternative embodiments of electroadhesive grippers may be employed to sort items based on item-identifying information, among other factors.

FIG. 8A is an end view of an example electroadhesive sorting system 800 using an inclined electroadhesive conveyor belt 810 with separately addressable subsections. FIG. 8B is a top view of the example material-selective sorting system 800 shown in FIG. 8A. The system 800 includes an electroadhesive conveyor 810 that is oriented on a track with a slope transverse to its direction of conveyance. That is, the slope gradient is along the width of the belt 810, not the length, and is therefore substantially perpendicular to the direction of motion of the belt 810. Package 801 on the belt 810 is adhered to the outer gripping surface 816 by the electroadhesive force, which prevents items from falling sideways off of the belt 810. The belt has a high side edge 812 and an opposite low side edge 814, and items are generally urged (by gravity) to slide, tumble, roll, or otherwise move across the belt 810 from the high side edge 812 toward the low side edge 814. The belt 810 can include separately addressable sections 830, 832, 834, which can be operated substantially independently to adhere (or not adhere) to items situated within the respective subsection. Thus, each of subsections 830-834 can include respective rolling connectors for applying different voltages to the terminals along the inner side of the belt 810 such that each separately addressable portion of the belt 810 exhibits the electroadhesive behavior specified by the rolling connectors within each of the subsections 830-834.

The group of packages 801-803 are electroadhesively secured to the belt 810 and conveyed through the subsections 830-834, as indicated by the directional arrows 851, 852. Each of the subsections 830-834 is associated with a particular delivery location 840-844. Upon releasing an item from one of the subsections (by turning off the applied voltage to that subsection) the item slides off of the belt 810, over the lower side edge 814, and into the delivery location associated with the subsection. For example, a package released while in subsection 830 undergoes a controlled slide to land in delivery location 840. Similarly, a package released while in subsection 832 lands in delivery location 842 and a package released while in subsection 834 lands in delivery location 844. FIG. 8B illustrates package 802 being released from subsection 832 and sliding off of the tilted conveyor belt 810 into delivery location 842. Subsection 832 is illustrated with cross-hatching to indicate electroadhesion is turned off in subsection 832 (e.g., rolling contacts under belt 810 within subsection 832 do not receive voltage to apply to electrodes within the belt 810).

A controller (not shown) determines which delivery location 840-844 to direct a particular package to, and controls the conveyor belt 810 to turn off electroadhesion in the subsection associated with the desired delivery location while the particular package is conveyed through the subsection. Thus, the controller can function to identify (or otherwise characterize) the packages 801-803, associate one of the delivery locations with identified package, and operate the electroadhesive conveyor belt 810 to release the identified package into the delivery location. Particular packages can be identified based on analysis of item-identifying data 824 detected via an item identifying system 820. The item identifying system 820 may receive radiation 822 from an identifying feature 801a, which may be a barcode, an RFID tag, etc. The radiation 822 may therefore be an RFID signature, light indicative of characteristic patterns and/or characters appearing on the package 801, etc. For illustrative purposes only, the packages 801-803 are illustrated with barcode patterns appearing on their top-facing surfaces (e.g., the barcode label 801a). However, it is noted that the item identifying system 820 may include a variety of radiation sensors configured to characterize the packages 801-803 (and/or other items) according to a variety of factors not limited to identifying labels adhered to such labels. For example, an image recognition system may be used to characterize and/or identify particular packages based on shape, reflectivity, recognition of characters and/or images on such packages, etc.

Figure 8C:
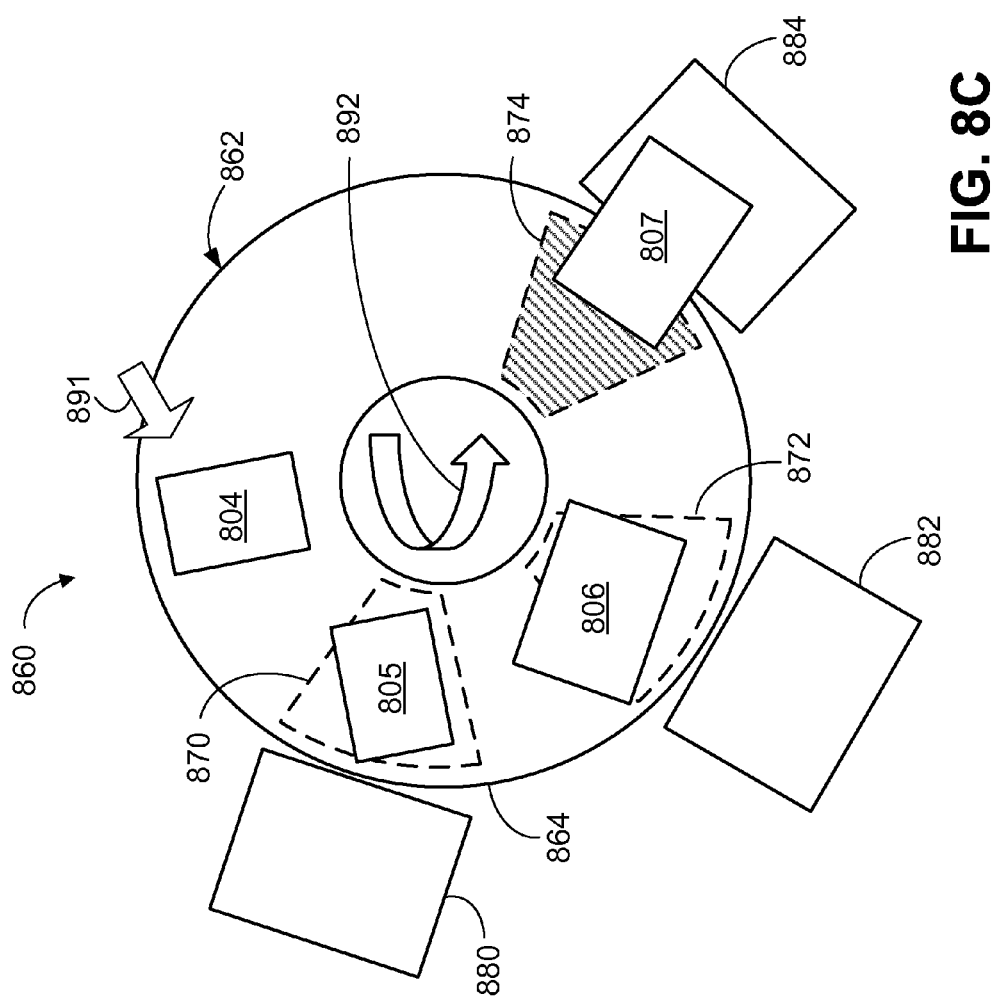
FIG. 8C is a top view of another example sorting system using a rotating conveyor with separately addressable subsections.

FIG. 8C is a top view of another example sorting system 860 using a rotating conveyor 862 with separately addressable subsections 870-874. The rotating conveyor 862 undergoes planar rotation, as indicated by the arrow 892. While the conveyor 862 rotates, packages situated thereon are prevented from sliding radially outward (e.g., due to the centrifugal inertia) by electroadhesive attraction with the rotating conveyor 862.

However, the separately addressable regions provide sequentially decreased electroadhesion forces to allow packages on the conveyor 862 to predictably and controllably slide off of the rotating surface toward a respective collection area 880-884. A group of packages 804-807 are loaded onto the electroadhesive surface of the rotating conveyor 862, as indicated by the arrow 891. The rotating conveyor 862 then directs the packages 804-807 through the separately addressable subsections 870-874. A controller operates to identify/characterize the packages and determine a delivery location for each of the packages 804-807. The controller then selectively controls the electroadhesion at each of the subsections 870-874 to release the packages such that they slide over the outer radial edge 864 of the conveyor 862 to desired delivery locations 880-884. FIG. 8C illustrates package 807 being released from subsection 874 and sliding off of the rotating conveyor belt 862 into delivery location 884. Similar to the convention in FIG. 8B, subsection 874 is illustrated with cross-hatching to represent that electroadhesion is turned off in the section.

The system 860 may operate according to item-identifying data that identifies/characterizes the individual items/packages loaded on the rotating conveyor 862, similar to the identifying system 830 described above in connection with the system 800 in FIGS. 8A-8B.

VI. Example Operations

Figure 9A:
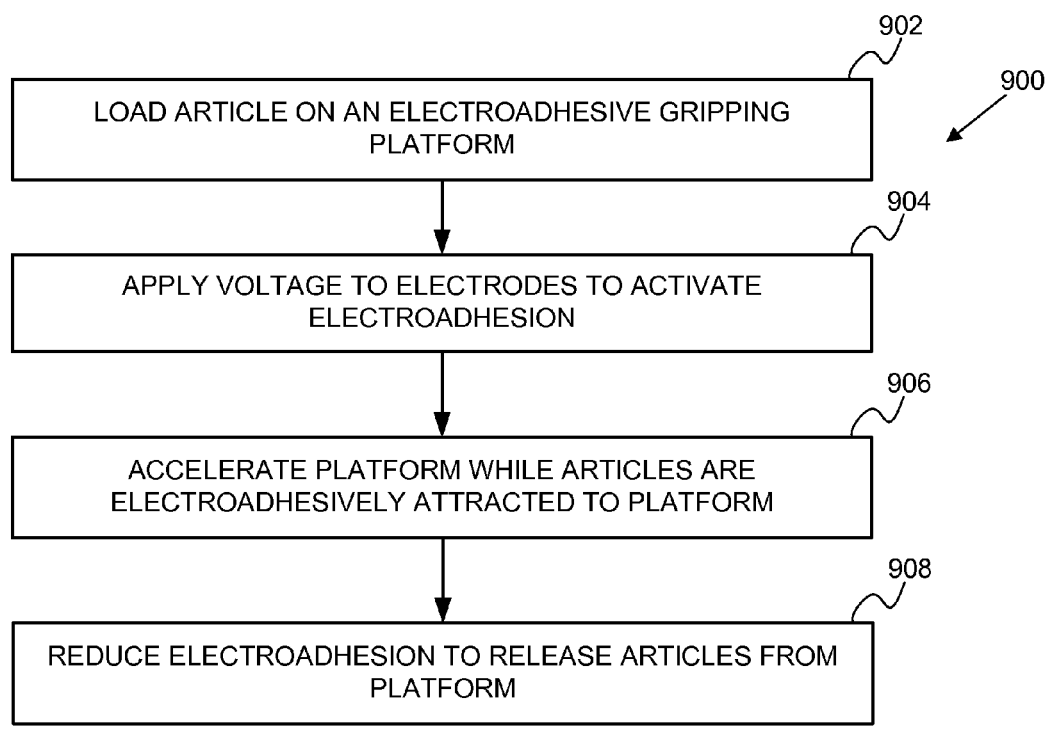
FIG. 9A is a flowchart of an example process for moving an item using an electroadhesive platform.

FIG. 9A is a flowchart of an example process 900 for moving an item using an electroadhesive platform. The process 900 may be carried out by any of the example systems described in connection with FIGS. 8A-8C above and/or any of the electroadhesive platforms and/or conveying systems described above in connection with FIGS. 3-6. An item is loaded on an electroadhesive gripping platform (902). For example, one or more packages, articles, items, parcels, luggage, etc., can be placed or otherwise distributed on an electroadhesive gripping surface. Voltage is applied to the gripper electrodes to cause the electroadhesive platform to adhere to the item loaded thereon (904). While the article is electroadhesively secured, the platform can then be accelerated to thereby move the loaded article from one place to another (906). During such movement, the electroadhesive platform can be manipulated by a mobile hoist, a rolling cart, etc., to accelerate while item remains electroadhesively secured in place. For example, an electroadhesive conveyor belt can be operated to move the conveying surface in a direction substantially parallel to the conveying surface of the belt. Once the loaded item reaches a desired destination (e.g., a delivery location or an area for unloading), the electroadhesion can be reduced to release the loaded articles from the platform (908). For example, the voltage applied to polarize the electrodes in block 904 can be reduced or even turned off such that the induced electroadhesive attraction between the platform and the article loaded thereon is reduced (or turned off). As a result, the articles are released from the electroadhesive platform and can either be unloaded or undergo a controlled slide to depart from the electroadhesive platform.

Figure 9B:
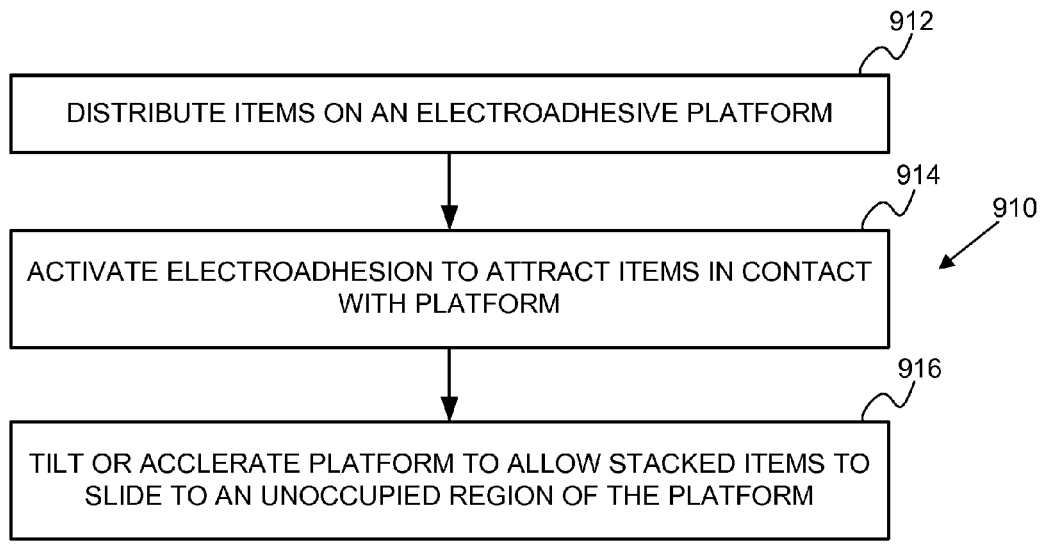
FIG. 9B is a flowchart of an example process for distributing items on an electroadhesive platform to achieve singulation.

FIG. 9B is a flowchart of an example process 910 for distributing items on an electroadhesive platform to achieve singulation. The process 910 may be carried out by any of the example systems described in connection with FIGS. 8A-8C above and/or any of the electroadhesive platforms and/or conveying systems described above in connection with FIGS. 3-7. Items are distributed on an electroadhesive platform (912). For example, a group of parcels, luggage items, etc., can be loaded onto an electroadhesive platform (e.g., an electroadhesive conveyor) for a sorting/handling facility. In general, some of the items distributed on the platform in block 912 may be stacked on others. Voltage is applied to electrodes in the electroadhesive platform to activate electroadhesive attraction between the electroadhesive platform and items in contact with the platform (914). The items in contact with the electroadhesive platform are thereby secured to the platform via the electroadhesive attraction. In block 914, items that are stacked on top of others may not be in direct contact with the electroadhesive platform and so such items may not be secured to the platform. The platform can then be tilted and/or accelerated to cause unsecured, stacked items to redistribute (e.g., via sliding off of secured items) to an unoccupied region of the electroadhesive platform (916). In some examples, the redistribution can be facilitated by vibrating the platform in addition to (or in the alternative of) tilting and/or accelerating the platform. Upon redistributing the items in block 916, the items remaining on the electroadhesive platform can be distributed in a single layer. Thus, the process 910 may be employed to distribute items with singulation for parcel sorting/handling applications.

Figure 9C:
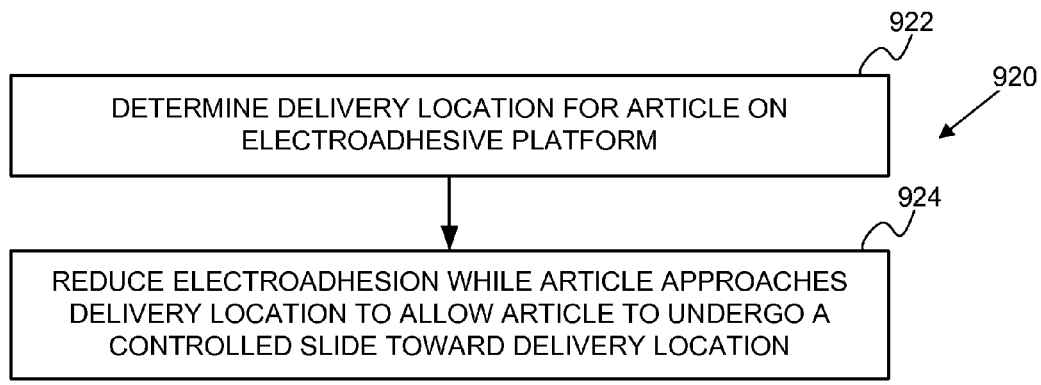
FIG. 9C is a flowchart of an example process for sorting items using a selectively addressable electroadhesive conveyor.

FIG. 9C is a flowchart of an example process 920 for sorting items using a selectively addressable electroadhesive conveyor. The process 910 may be carried out by any of the example systems described in connection with FIGS. 8A-8C above and/or any of the electroadhesive platforms and/or conveying systems described above in connection with FIGS. 3-6. A delivery location for an article on an electroadhesive platform is determined (922). For example, the article can be identified/characterized using item-identifying information obtained by an item identifying system (e.g., the item identifying system 820 in FIG. 8). A delivery location can then be selected based on the identifying information (e.g., based on shipping instructions, information in a look up table, etc.). The platform can then be used to convey the articles toward the determined delivery location, and electroadhesion can be reduced as the article approaches the desired delivery location to allow the article to undergo a controlled slide toward the delivery location (924). Upon reduction of the electroadhesive force, the article can exit the platform by sliding along a path determined by one or more of an inertial path traversed by the item and/or a path defined, at least in part, by gravity.

Figure 10:
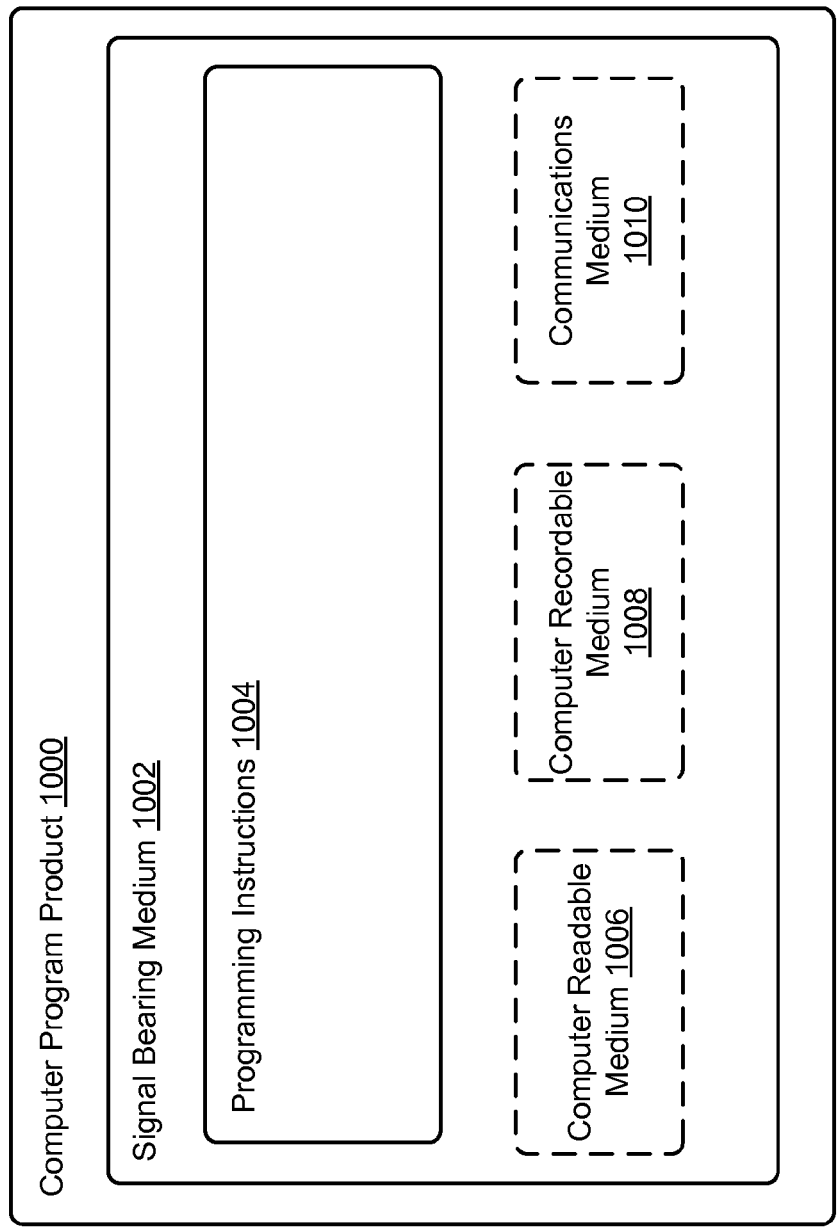
FIG. 10 depicts a computer-readable medium configured according to an example embodiment.

FIG. 10 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture. FIG. 10 is a schematic illustrating a conceptual partial view of an example computer program product that includes a computer program for executing a computer process on a computing device, arranged according to at least some embodiments presented herein, including the processes shown and described in connection with FIG. 9.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 can include a non-transitory computer-readable medium 1006, such as, but not limited to, a hard disk drive, a Compact Disc (CD), a Digital Video Disk (DVD), a digital tape, memory, etc. In some implementations, the signal bearing medium 1002 can be a computer recordable medium 1008, such as, but not limited to, memory, read/write (R/W) CDs, R/W DVDs, etc. In some implementations, the signal bearing medium 1002 can be a communications medium 1010, such as, but not limited to, a digital and/or an analog communication medium (e.g., a fiber optic cable, a waveguide, a wired communications link, a wireless communication link, etc.). Thus, for example, the signal bearing medium 1002 can be conveyed by a wireless form of the communications medium 1010.

The one or more programming instructions 1004 can be, for example, computer executable and/or logic implemented instructions. In some examples, a computing device is configured to provide various operations, functions, or actions in response to the programming instructions 1004 conveyed to the computing device by one or more of the computer readable medium 1006, the computer recordable medium 1008, and/or the communications medium 1010.

The non-transitory computer readable medium 1006 can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
    a conveyor belt having a plurality of separately addressable regions, wherein each separately addressable region includes one or more electrodes in the conveyor belt that are electrically isolated from electrodes in adjacent regions;
    an electroadhesive platform comprising one of the plurality of separately addressable regions;
    a power supply configured to electrically connect to the electrodes in the conveyor belt through one or more rolling contacts; and
    a controller configured to: (i) control the power supply to apply a voltage to the one or more electrodes in the electroadhesive platform to thereby cause the electroadhesive platform to adhere to an item disposed on the electroadhesive platform such that the item resists moving with respect to the electroadhesive platform and (ii) control the power supply to reduce the voltage applied to the one or more electrodes such that the item moves with respect to the electroadhesive platform.

2. The system according to claim 1, wherein the electroadhesive platform includes a compliant electroadhesive gripping surface that is attracted to an exterior surface of the item responsive to the voltage being applied.

3. The system according to claim 1, wherein the applied voltage is sufficient to cause the item to substantially track a path of the electroadhesive platform while the electroadhesive platform is in motion.

4. The system according to claim 1, further comprising:
    a sensor configured to detect that an item is disposed on the electroadhesive platform, and
    wherein the controller is further configured to receive data from the sensor and control the power supply based on the received data, such that the voltage is applied responsive to the sensor indicating that the item is disposed on the electroadhesive platform.

5. The system according to claim 1, wherein the controller is further configured to receive an indication to release the item from the electroadhesive platform, and reduce the voltage applied to the one or more electrodes in response to receiving the indication.

6. The system according to claim 1, further comprising:
    wherein the controller is further configured to reduce the voltage applied to the one or more electrodes while the electroadhesive platform approaches a delivery area associated with a particular item disposed on the platform, such that the particular item moves from the surface of the platform to the delivery area.

7. The system according to claim 6, further comprising:
    a scanner configured to identify the particular item based on identifying radiation reflected or transmitted by the particular item, and
    wherein the controller is further configured to receive data from the scanner and determine the delivery area associated with the particular item based on the received data.

8. A system comprising:
    an electroadhesive conveyor belt including (i) an outer surface, (ii) an inner surface, (iii) one or more electrodes arranged between the inner and outer surfaces, and (iv) one or more conductive terminals situated along the inner surface and electrically connected to corresponding ones of the one or more electrodes, wherein the electroadhesive conveyor belt includes a plurality of separately addressable regions, and wherein a given region includes one or more electrodes arranged between the inner and outer surfaces of the electroadhesive conveyor belt that are electrically isolated from electrodes in adjacent regions;
    a power supply configured to electrically connect to the one or more electrodes in the electroadhesive conveyor belt via the one or more conductive terminals;
    a driving system configured to cause the electroadhesive conveyor belt to circulate such that the outer surface of the electroadhesive conveyor belt moves along a predetermined track; and
    a controller configured to control the power supply to apply a voltage to the one or more electrodes in the electroadhesive conveyor belt to thereby cause the electroadhesive conveyor belt to adhere to an item disposed on the outer surface such that the item resists moving with respect to the outer surface.

9. The system according to claim 8, further comprising an arrangement of rolling contacts electrically connected to the power supply and positioned along the predetermined track to contact the one or more conductive terminals along the inner surface of the electroadhesive conveyor belt.

10. The system according to claim 8, further comprising an arrangement of rolling contacts electrically connected to the power supply and positioned along the predetermined track to contact the one or more conductive terminals along the inner surface of the electroadhesive conveyor belt, and
    wherein the controller is further configured to control the power supply to apply a particular voltage to the rolling contacts at a particular location on the predetermined track such that subsequent ones of the separately addressable regions passing the particular location on the track are charged according to the particular voltage.

11. The system according to claim 8, wherein the controller is further configured to control the power supply to reduce the voltage applied to the one or more electrodes such that the item moves with respect to the outer surface of the electroadhesive conveyor belt.

12. The system according to claim 11, wherein the controller is further configured to control the power supply to reduce the voltage applied to the one or more electrodes used to adhere a particular item on the electroadhesive conveyor belt while the particular item approaches a delivery area, such that the particular item moves from the outer surface of the electroadhesive conveyor belt to the delivery area.

13. A method comprising:
applying a voltage to one or more electrodes in an electroadhesive platform to thereby cause the electroadhesive platform to adhere to an item disposed on the electroadhesive platform, wherein the electroadhesive platform comprises one of a plurality of separately addressable regions of a conveyor belt, and wherein each separately addressable region includes one or more electrodes that are electrically isolated from electrodes in adjacent regions;
moving the electroadhesive platform while applying the voltage, such that the item substantially tracks a path of the electroadhesive platform; and
reducing the voltage applied to the one or more electrodes such that the item moves with respect to the electroadhesive platform.

14. The method according to claim 13, further comprising
determining that the item is disposed on the electroadhesive platform; and
wherein the voltage is applied responsive to the determination that the item is disposed on the electroadhesive platform.

15. The method according claim 13, further comprising:
determining to release the item adhered to the electroadhesive platform; and
wherein the voltage is reduced responsive to the determination to release the item.

* * * * *